(12) United States Patent
Graham

(10) Patent No.: US 11,343,959 B2
(45) Date of Patent: May 31, 2022

(54) AIR FLOW DISTRIBUTION CONTROL FOR CURVE COMPENSATION ON AIR-SEEDING CARTS AND TOOLS

(71) Applicant: Deere & Company, Moline, IL (US)

(72) Inventor: William D. Graham, East Moline, IL (US)

(73) Assignee: Deere & Company, Moline, IL (US)

( * ) Notice: Subject to any disclaimer, the term of this patent is extended or adjusted under 35 U.S.C. 154(b) by 289 days.

(21) Appl. No.: 16/670,308

(22) Filed: Oct. 31, 2019

(65) Prior Publication Data

US 2021/0127556 A1    May 6, 2021

(51) Int. Cl.
*A01C 7/08*  (2006.01)
*A01C 7/10*  (2006.01)
*G05D 1/02*  (2020.01)

(52) U.S. Cl.
CPC .............. *A01C 7/082* (2013.01); *A01C 7/102* (2013.01); *G05D 1/0278* (2013.01); *G05D 2201/0201* (2013.01)

(58) Field of Classification Search
CPC ......... A01C 7/082; A01C 7/102; A01C 7/081; A01C 7/08; A01C 7/00; A01C 7/10; G05D 1/0278; G05D 2201/0201; G05D 1/0276; G05D 1/021; G05D 1/02; G05D 1/00; G05D 2201/02; G05D 2201/00
See application file for complete search history.

(56) References Cited

U.S. PATENT DOCUMENTS

| 9,648,801 B2 | 5/2017 | Borkgren et al. |
| 2016/0081262 A1 | 3/2016 | Roberge et al. |
| 2017/0086353 A1 | 3/2017 | Borkgren et al. |
| 2018/0134503 A1 | 5/2018 | Hui et al. |

OTHER PUBLICATIONS

Extended European Search Report and Written Opinion issued in European Patent Application No. 20202459.2, dated Apr. 13, 2021, in 5 pages.

*Primary Examiner* — Christopher J. Novosad
(74) *Attorney, Agent, or Firm* — Tucker Ellis LLP; Heather M. Barnes; Michael G. Craig

(57) ABSTRACT

An air distribution system for a seed cart provides for improved air flow distribution upon identification of a turning event. The seed cart may have a fan operable to create an air stream. A set of primary tubes coupled to the fan may receive separate portions of the air stream from the fan. A distribution manifold may have a first plurality of passages therethrough and a second plurality of passages therethrough. A restrictor assembly may comprise a first end, a second end oppositely disposed from the first end, and a plurality of inlets and a plurality of outlets disposed therebetween. The restrictor assembly may have a plurality of restriction components. Restriction of air flow proximate the first end is different than the restriction of air flow proximate the second end.

20 Claims, 18 Drawing Sheets

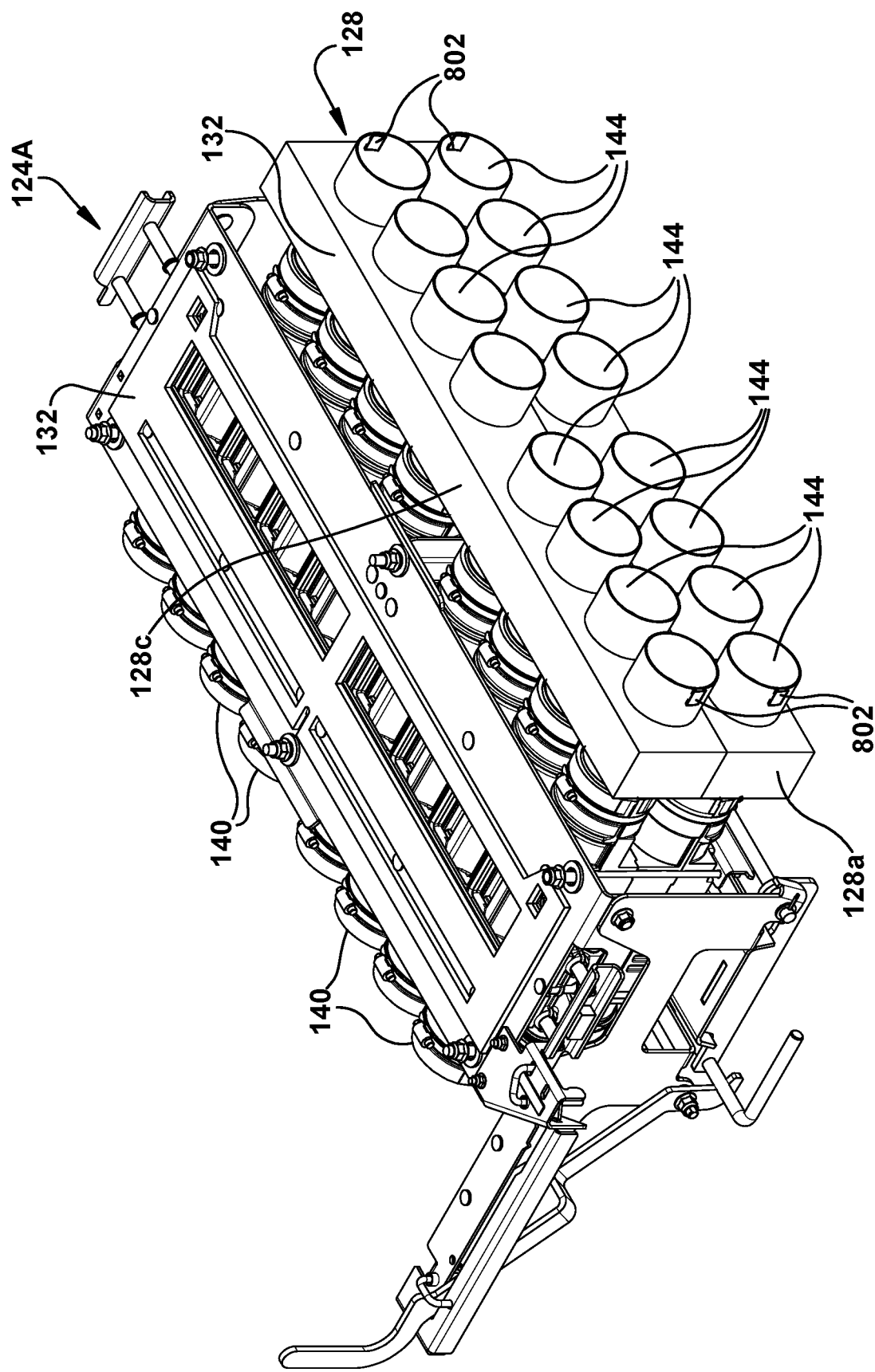

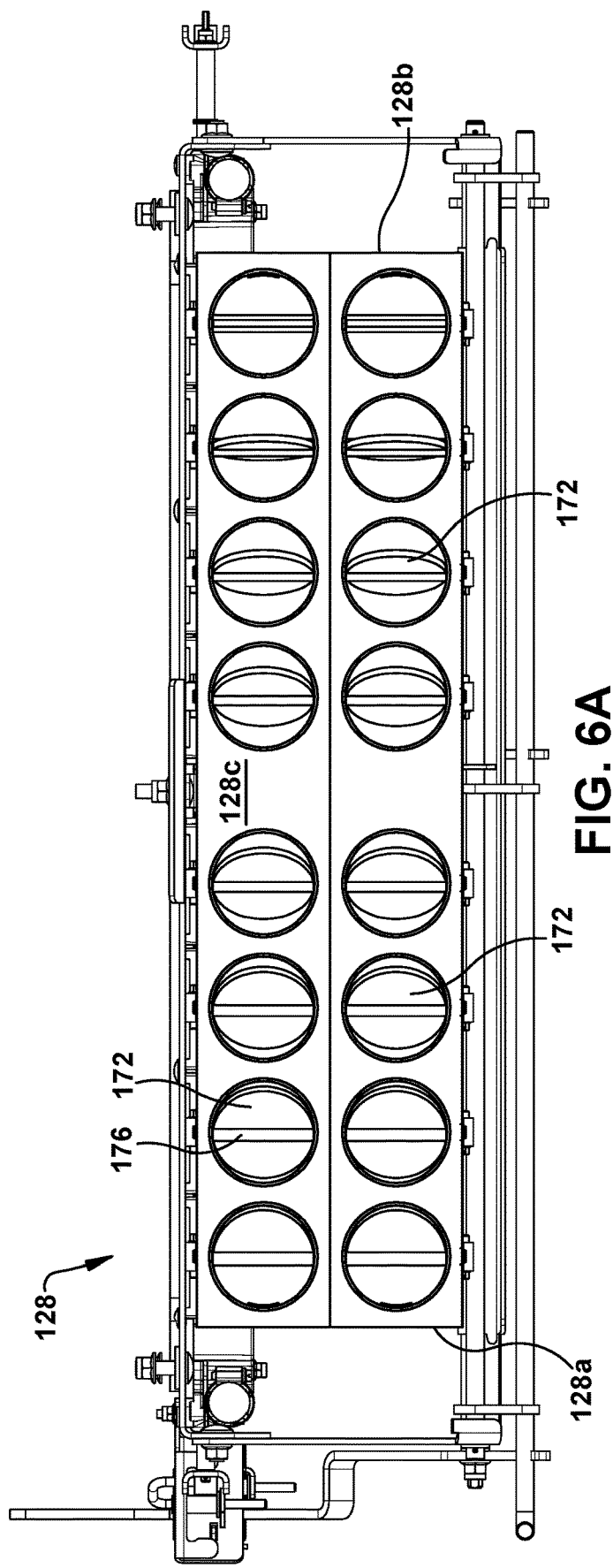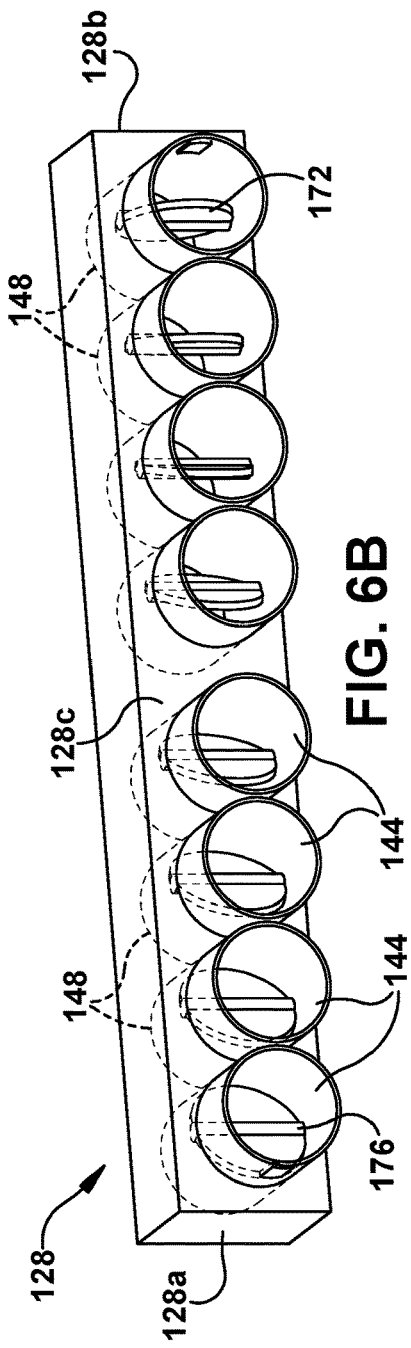

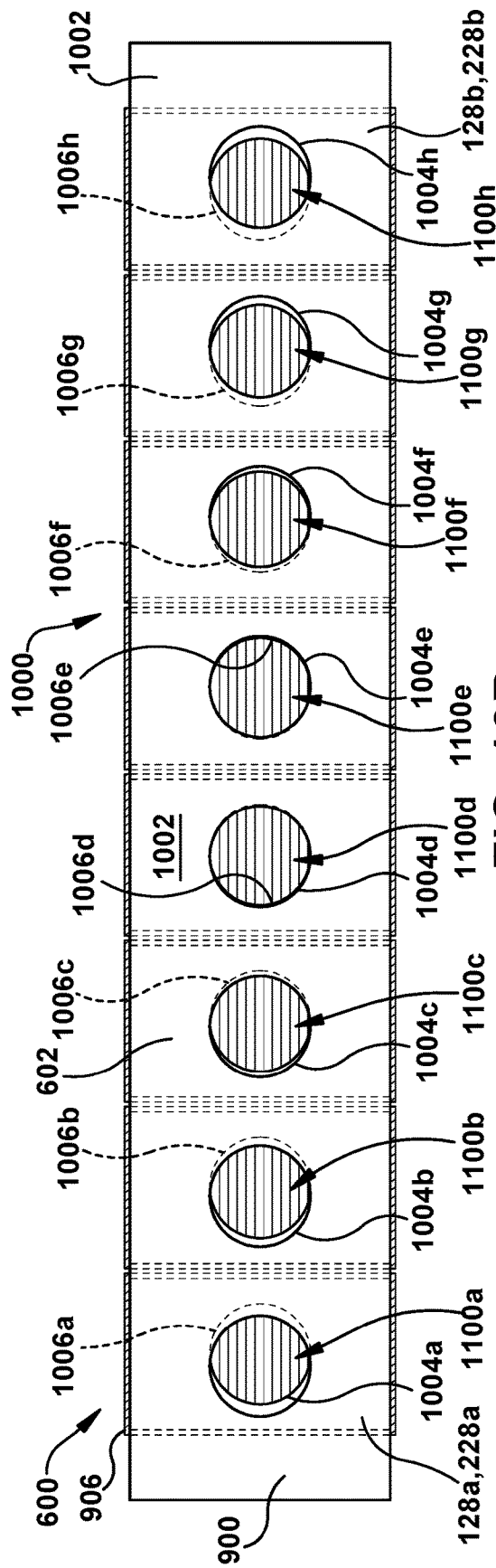
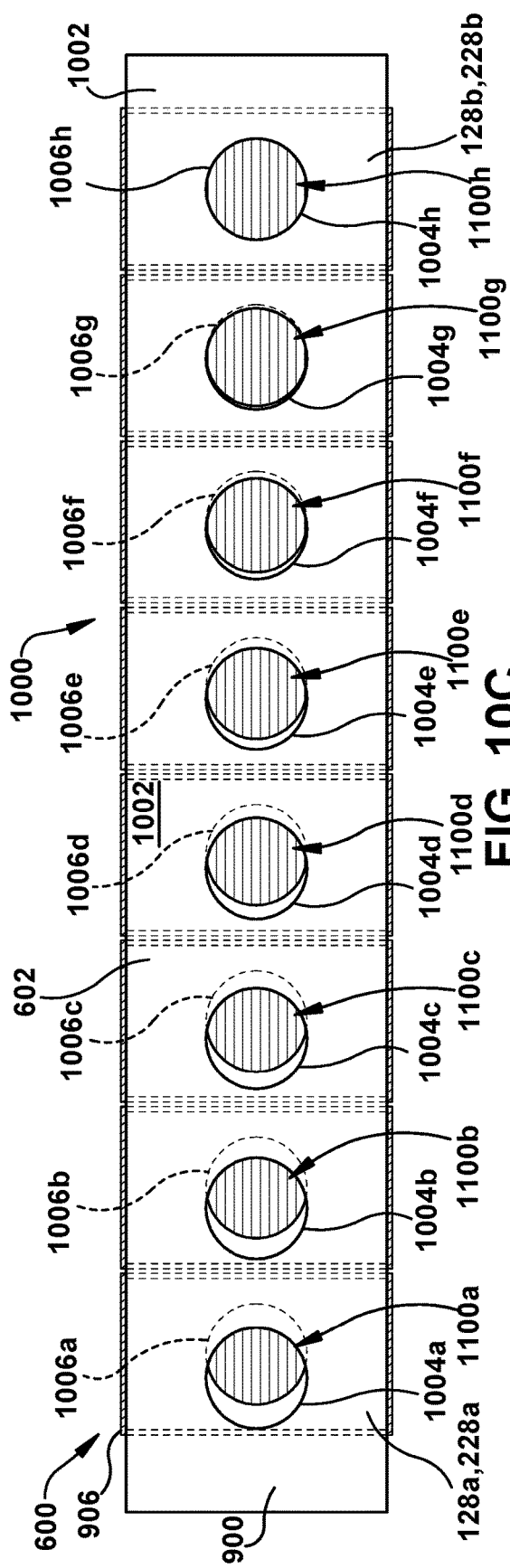

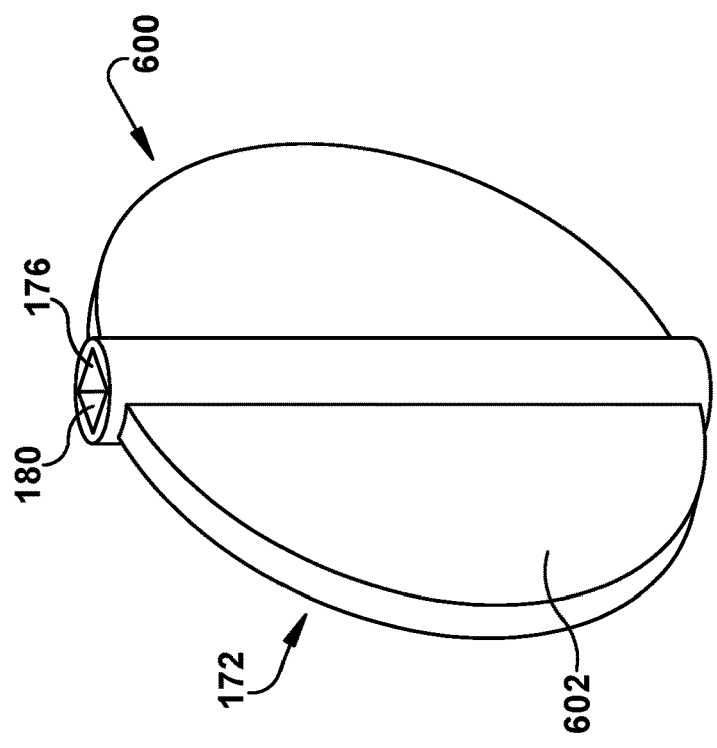
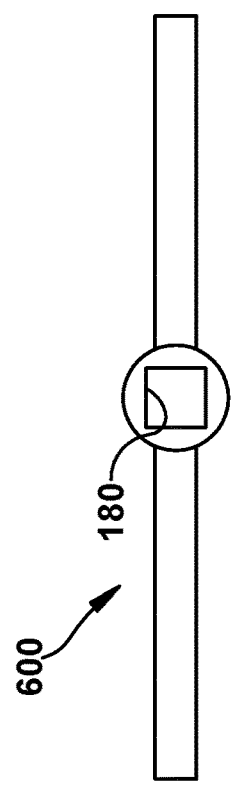
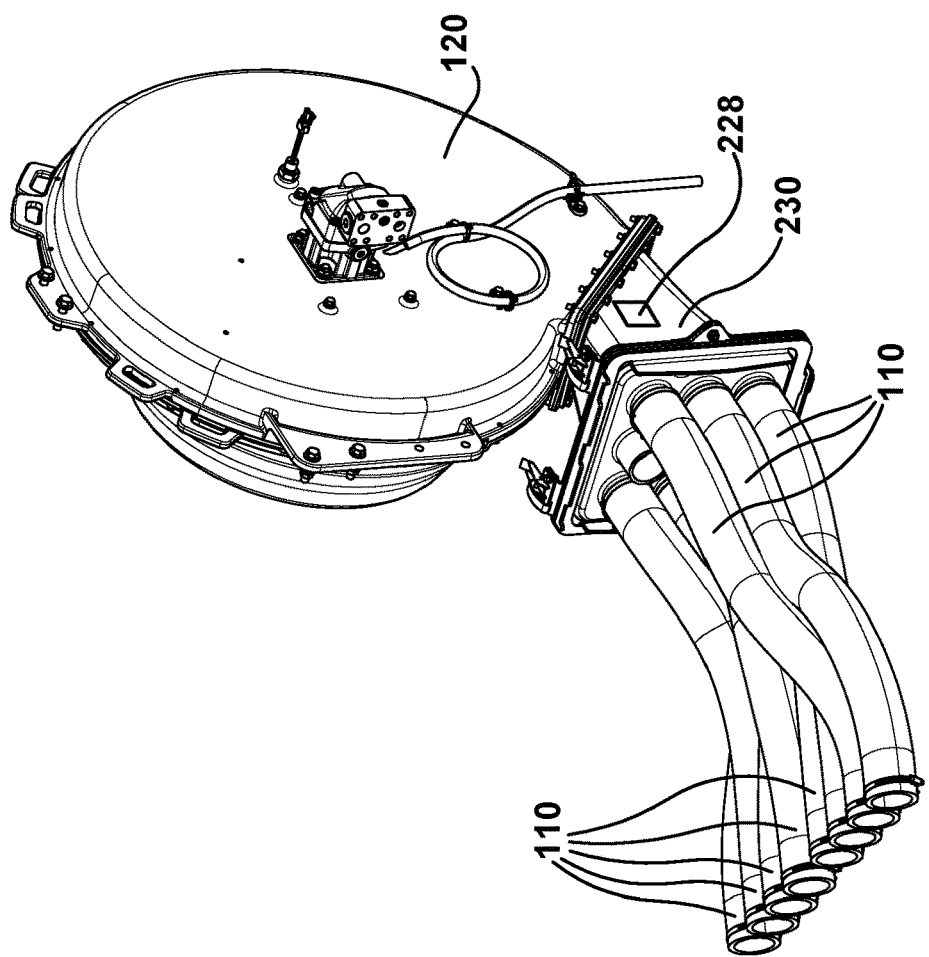

AIR FLOW DISTRIBUTION CONTROL FOR CURVE COMPENSATION ON AIR-SEEDING CARTS AND TOOLS

BACKGROUND

Air seeders are frequently used for agricultural purposes. As product load of a given commodity increases in the air stream, back pressure in the air distribution system increases. While planting crops or other agricultural applications, operators may travel in a substantially straight path. Oftentimes, the operator is required to turn. Reasons for turning may include simply a change in direction to cover a field or to move around obstacles, such as trees, lakes, ponds or other unseeded or untrafficable areas. As a seeding cart and/or related tool is moving through a turn or curve, commodity distribution issues may occur.

On the inside curve of a turn, too much commodity may be delivered while on the outside curve of a turn, there may not be enough commodity delivered which could lead to reduced yields. On the inside curve of a turn, too much air flow may cause the commodity to blow out of the ground. On the outside curve of a turn, there may not be enough air flow, which could lead to plugged primary hoses.

Operators may run the air seeder at the highest anticipated pressure to prevent plugging of the primary hoses, but this may consume excess energy and possibly cause unneeded noise, commodity damage, hose wear, and issues with commodity placement due to the excess air flow or air pressure. There is a need in the art for improved air flow distribution across a seeding cart and/or tool for more consistent commodity placement in the ground and prevention of plugging primary hoses while operators are in turning positions with air seeders.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for air flow distribution control for curve compensation on air-seeding carts and tools. For example, a seed cart may have a chassis, which may be configured for attachment to an air seeding tool. A fan may be operable to create an air stream. A set of primary tubes may be fluidly coupled to the fan to respectively receive separate portions of the air stream from the fan. A distribution manifold may have a plurality of air inlets. A restrictor assembly may comprise a first end, a second end oppositely disposed from the first end, a plurality of inlets disposed between the first end and the second end and respectively fluidly coupled with a corresponding primary tube of the set of primary tubes. The restrictor assembly may also have a plurality of outlets respectively fluidly coupled to each one of the plurality of inlets of the distribution manifold. The restrictor assembly may also have a restrictor component having a body and configured to selectably move to restrict air flow upon identification of a turning event, wherein the restriction of air flow proximate the first end may be different than the restriction of air flow proximate the second end.

In another example, a method for restricting air flow for an air seeder, may comprise the steps of creating an air stream with a fan; directing the air stream into a set of primary tubes; fluidly communicating the air from the primary tubes to a restrictor assembly. The restrictor assembly may comprise a first end, a second end oppositely disposed from the first end, a plurality of inlets disposed between the first end and the second end and respectively fluidly coupled with a corresponding primary tube of the set of primary tubes, a plurality of outlets respectively fluidly coupled to one of the plurality of passages of a distribution manifold and a restrictor component having a body. The method may also comprise triggering a turning condition and selectably moving the restrictor component. After selectably moving the restrictor component, the method may further comprise decreasing air flow proximate the first end of the restrictor assembly and increasing air flow proximate the second end of the restrictor assembly.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIG. 5B is a perspective view of a component diagram illustrating another implementation of one or more portions of one or more systems described herein.

FIG. 6A is a component diagram illustrating another implementation of one or more portions of one or more systems described herein.

FIG. 6B is a component diagram illustrating another implementation of one or more portions of one or more systems described herein.

FIG. 10B is a component diagram illustrating an implementation of one or more portions of one or more systems described herein.

FIG. 10C is a component diagram illustrating another implementation of one or more portions of one or more systems described herein.

FIG. 12 is a component diagram illustrating another implementation of one or more portions of one or more systems described herein.

FIG. 13 is a component diagram illustrating another implementation of one or more portions of one or more systems described herein.

FIG. 14 is a component diagram illustrating another implementation of one or more portions of one or more systems described herein.

DETAILED DESCRIPTION

Figure 1:
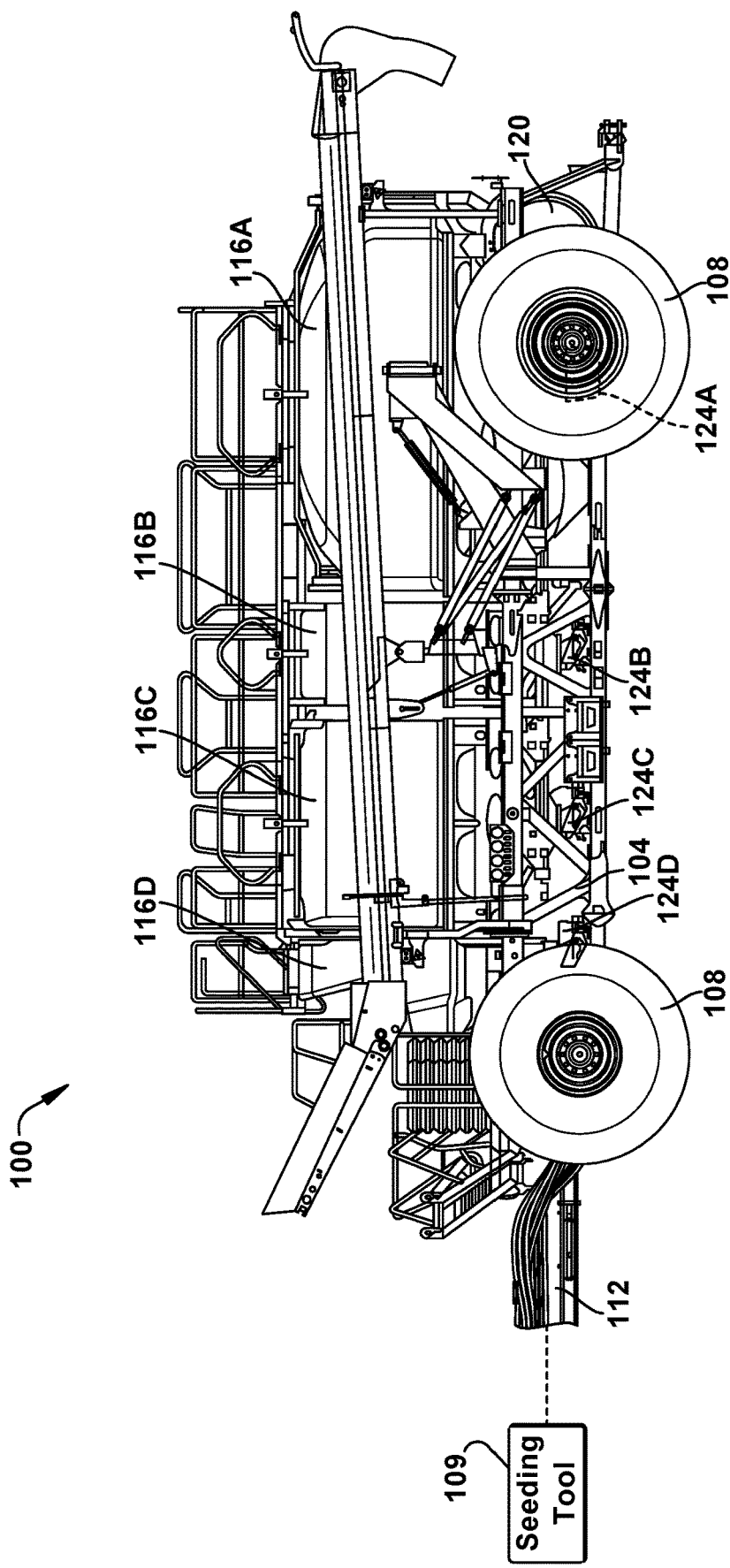
FIG. 1 is a component diagram illustrating one implementation of an example seed cart.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Air seeders are a principal piece of equipment for agricultural use. Even distribution of commodity, for example, fertilizer, seeds, etc., across a field is a desirable objective. Curve compensation is a technique of providing a more even distribution of commodity during a turn by varying the amount of product metered into the airstream according to the travel speed of the associated frame section on a tool. Air distribution systems experience increased back pressure with increased commodity load in the air stream. This is especially true during a turning event as operators maneuver around trees, lakes, ponds, obstacles or when simply changing general direction in the field. Depending on the turn radius, the commodity load needed (e.g., to maintain constant seeding rates across the width of the machine) on the inside curve may theoretically go to zero (as the turn radius approaches zero, the seeding rate also approaches zero) and the rate needed on the outside curve increases, e.g., the rate on the outside curve could be double the rate at the center of the machine. This change may cause product distribution issues. For example, commodity may blow out of the ground at the inside curve because of increased air flow being experienced due to a reduced product load. In addition, if airflow is constant across the width of the machine, the equipment may experience plugged primary hoses on the outside curve of the turn because of insufficient air flow for the increased product load due to the greater distance being traveled along the outside curve. Varying the air flow across the air distribution manifold, and then, likewise, the air seeder tool may compensate for the differing commodity delivery rates induced by a curve compensation system. In one nonlimiting implementation, it may be useful to throttle the airflow to rows which are not delivering commodity due to being shut off by section control. Section control may be where individual commodity flow is restricted or turned off in one or more primary tubes to control or meter commodity distribution to the ground, for example, to avoid the occurrence of double seeding or double fertilizing.

Figure 2:
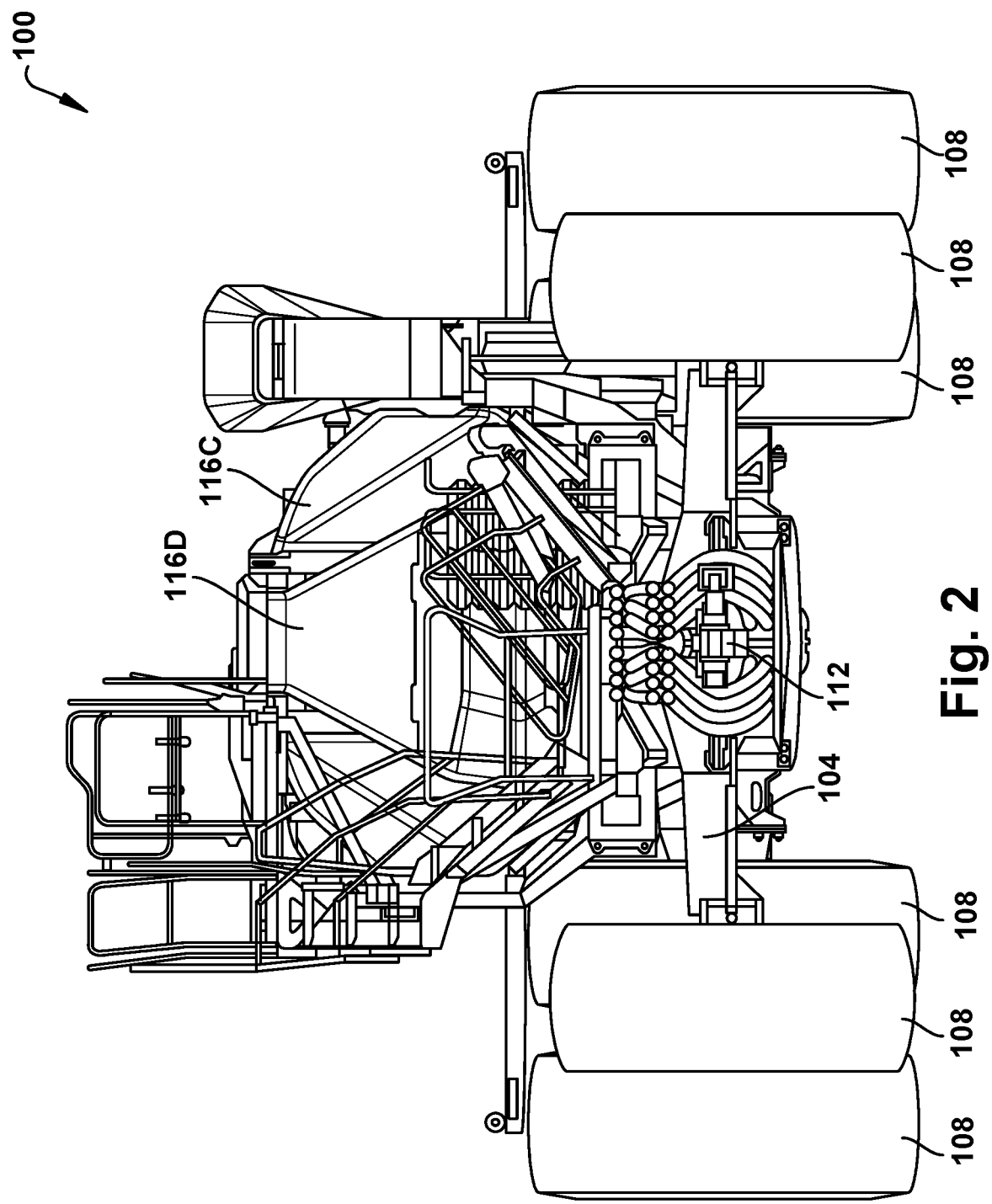
FIG. 2 is a front view of a seed cart of FIG. 1.
Figure 3:
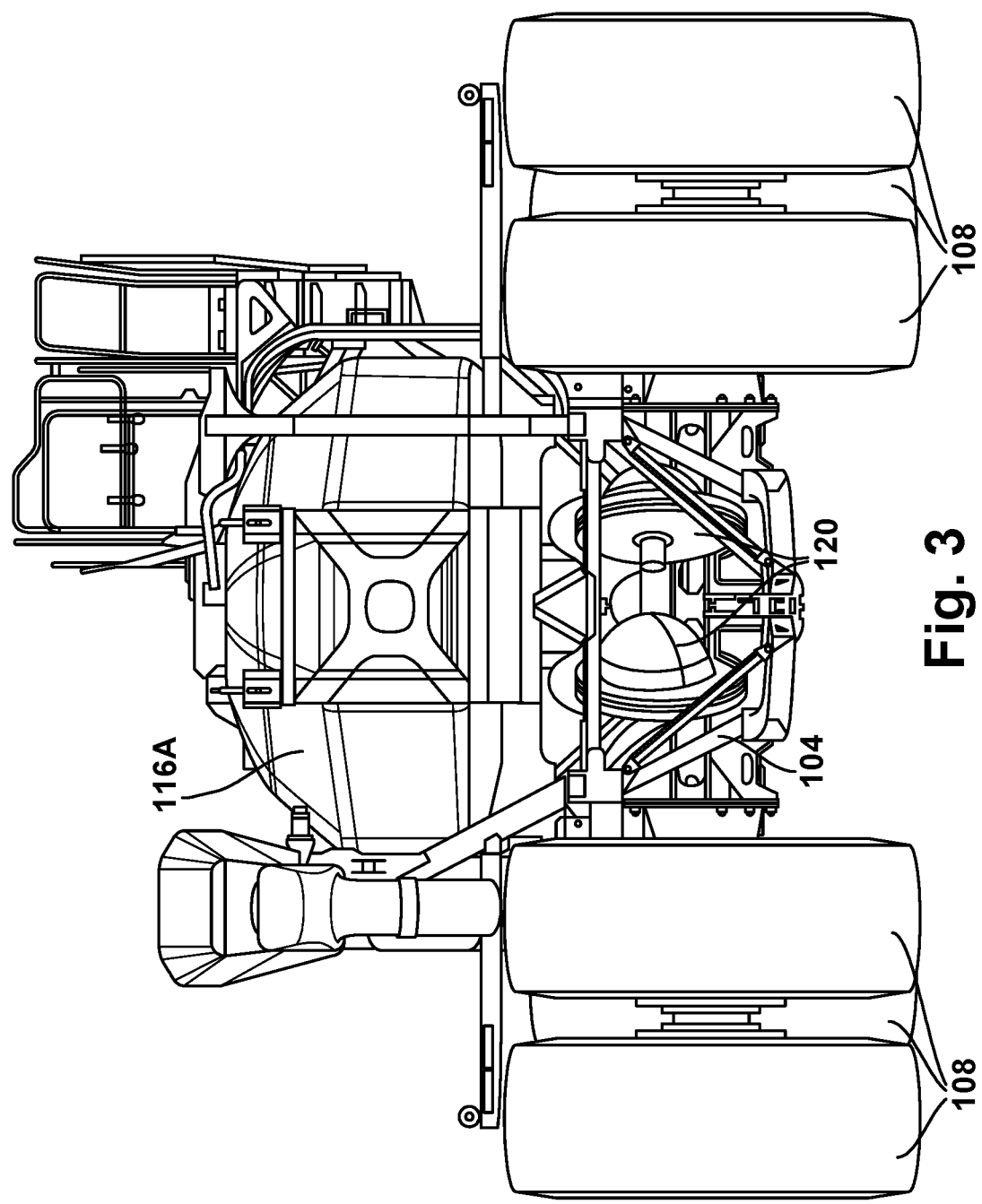
FIG. 3 is a rear view of the seed cart of FIG. 1.

A seed cart 100 of an air seeder is shown in FIGS. 1-3. The seed cart 100 includes a chassis 104 with wheels 108 to enable the seed cart 100 to roll along the ground in a field. The seed cart 100 may be accompanied by a seeding tool 109 such as a tilling implement that receives commodities (including, for example, fertilizer, seeds, and starter fertilizer) from the seed cart 100, and delivers the commodities to the ground. Both the seed cart 100 and the corresponding tilling implement may be pulled by a tractor (not shown). The seed cart 100 may include a coupler 112 on a forward or leading side thereof for connection to the towing vehicle. The coupler 112 of the seed cart 100 can be connected directly to the tilling implement positioned between the tractor and the seed cart 100. In other constructions, the seed cart 100 may be connected to the tractor directly, with the tilling implement behind the seed cart 100. In another nonlimiting implementation, the seed cart 100 and seeding tool 109 or other tilling implement may be combined into one chassis 104. In any arrangement, the seed cart 100 stores quantities of the commodities and utilizes air flow through a plurality of primary air passages or "primaries" 110 to deliver the commodities to the tilling implement or other seeding tool 109. At the tilling implement 109, the primaries 110 may be further divided at a dividing tower (manifold) into a greater number of secondary delivery passages.

Figure 4:
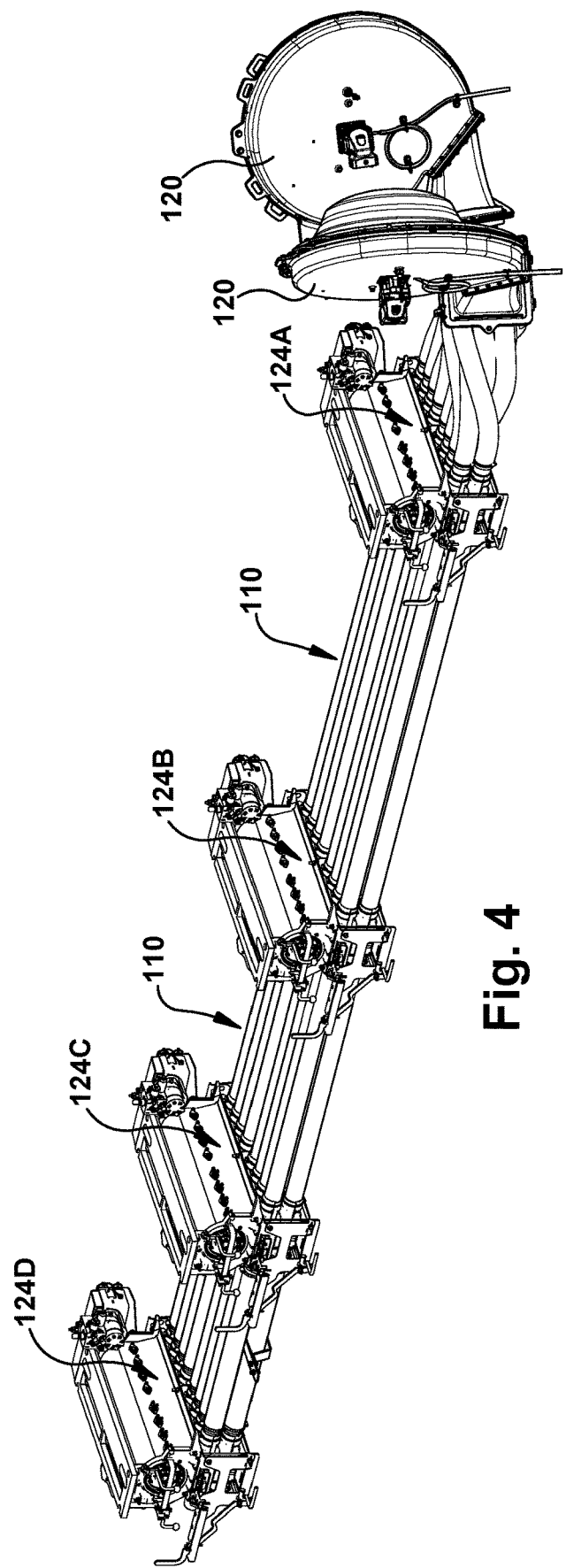
FIG. 4 is a perspective view of a component of the seed cart shown in FIG. 1.

One or more tanks 116A-D may be supported on the chassis 104. Each of the tanks 116A-D defines a corresponding volume separate from the others for receiving a corresponding commodity. The sizes and shapes of the tanks 116A-D may vary from that shown, and the types of commodity put into each tank 116A-D may be selected by the user according to the intended planting and/or fertilizing operation. As shown, each of the tanks 116A-D is positioned at a unique location along the longitudinal direction of the seed cart 100, which is the direction of travel defined by the wheels 108. Each of the tanks 116A-D in the illustrated implementation has a size and shape unlike each of the others, although other constructions may utilize one or more similar or identical tanks on the seed cart 100. In other constructions, a single tank with multiple, separate internal compartments may be used. First and second fans 120 are operable to create separate air streams. The fan 120 may have a fan plenum 230 operably connected thereto, as shown in FIG. 12. A set of primary tubes 110 may be fluidly coupled to the fan 120 to respectively receive separate portions of each air stream from the fan 120. Although the seed cart 100 can allow great flexibility in how the commodities are dispensed from the respective tanks 116A-D, the first and second air streams are independent from each other and are controlled in a precise manner as described in further detail below. As shown in FIG. 4, a plurality of distribution manifolds 124A-D corresponding to the number of tanks 116A-D is provided on the seed cart 100. Each distribution manifold 124A-D may be arranged below a corresponding one of the tanks 116A-D and in communication therewith to receive and selectively distribute the commodity therefrom. It is also contemplated to be within the scope of another implementation to use one fan 120 with a single row of passages. In another implementation, three fans may be utilized to correspond with three rows of passages. In another implementation, a C-type air system which has one hose per row may be utilized.

With continued reference to FIG. 4, each distribution manifold 124A-D may include multiple separate groups or sets of passages making up a portion of the primaries 110 along the seed cart 100. The separate sets of passages can be provided as separate ranks or rows. Each distribution manifold 124A-D can include an upper row of passages and a lower row of passages. Each distribution manifold 124A-D can also include one or more middle rows of passages between the upper row of passages and the lower row of passages. A first one of the distribution manifolds 124A is positioned nearer the fans 120 than the other distribution manifolds 124B-D. The first distribution manifold 124A is the furthest upstream distribution manifold and may receive the two air streams from the two fans 120. Each of the distribution manifolds 124A-D may include valves and corresponding venturis operable to selectively convey the commodity within the corresponding tank 116A-D to a selected one or more of the primaries (i.e., one or more of the three stacked rows of passages within the distribution manifold 124A-D). Each distribution manifold 124A-D may receive the commodity from the tank 116A-D through a corresponding product meter coupled therebetween. The product meter is operable to adjustably deliver the commodity to the primaries according to a predetermined delivery rate. Outlets of each row of passages of the first distribution manifold 124A may be coupled to inlets of the following distribution manifold 124B and so on, such that any given row of the primaries can selectively join any desired combination of commodities within the provided tanks 116A-D to the tilling implement for placement together. Typically, although not necessarily, the upper row of primaries, including the upper row of passages of each of the distribution manifolds 124A-D, is used for the highest mass flow or largest particle size commodity delivery (e.g., fertilizer, peas), while the middle (not shown) and lower rows of primaries are used for lower mass flow commodity delivery (e.g., seeds, innoculants, and starter fertilizer).

FIGS. 5A, 5B, and 7-11C illustrate various example implementations of a restrictor assembly 128, which may be fluidly coupled between the fan 120 and the first distribution manifold 124A. In one implementation, the restrictor assembly 228 may be mounted to the fan 120 and fluidly coupled to individual primary tubes 110. In another implementation, the restrictor assembly 128 may be close coupled with cuffs to the first distribution manifold 124A in a manner chosen with sound engineering judgment, such as with a duct or hose from the fan 120 or with the fan 120 mounted to the restrictor assembly 128. The restrictor assembly 128 may be fluidly coupled to one or more primary tubes 110 anywhere between the fan 120 and the first distribution manifold 124A. In another implementation, the restrictor assembly may be disposed in the fan plenum 230.

The restrictor assembly 128 may comprise a first end 128a and a second end 128b oppositely disposed from the first end 128 forming an axis A-A. The restrictor assembly 128 may also comprise a center portion 128c. As shown in FIG. 6B, a plurality of inlets 144 and plurality of outlets 148 may be disposed in the restrictor assembly 128, 228. Each of the inlets 144 and outlets 148 (e.g., each inlet 144 and outlet 148 pair) may form a passageway. As such, the plurality of restrictor assembly inlets 144 may be disposed between the first end 128a, 228a and the second end 128b, 228b and respectively fluidly coupled with a corresponding primary tube of the set of primary tubes 110. Each of the outlets 148 may be respectively fluidly coupled to each one of the inlets 136 of the first distribution manifold 124A. The restrictor assembly 128 may be positioned fluidly upstream of the first distribution manifold 124A to improve air flow distribution in the set of primary tubes 110.

Figure 5A:
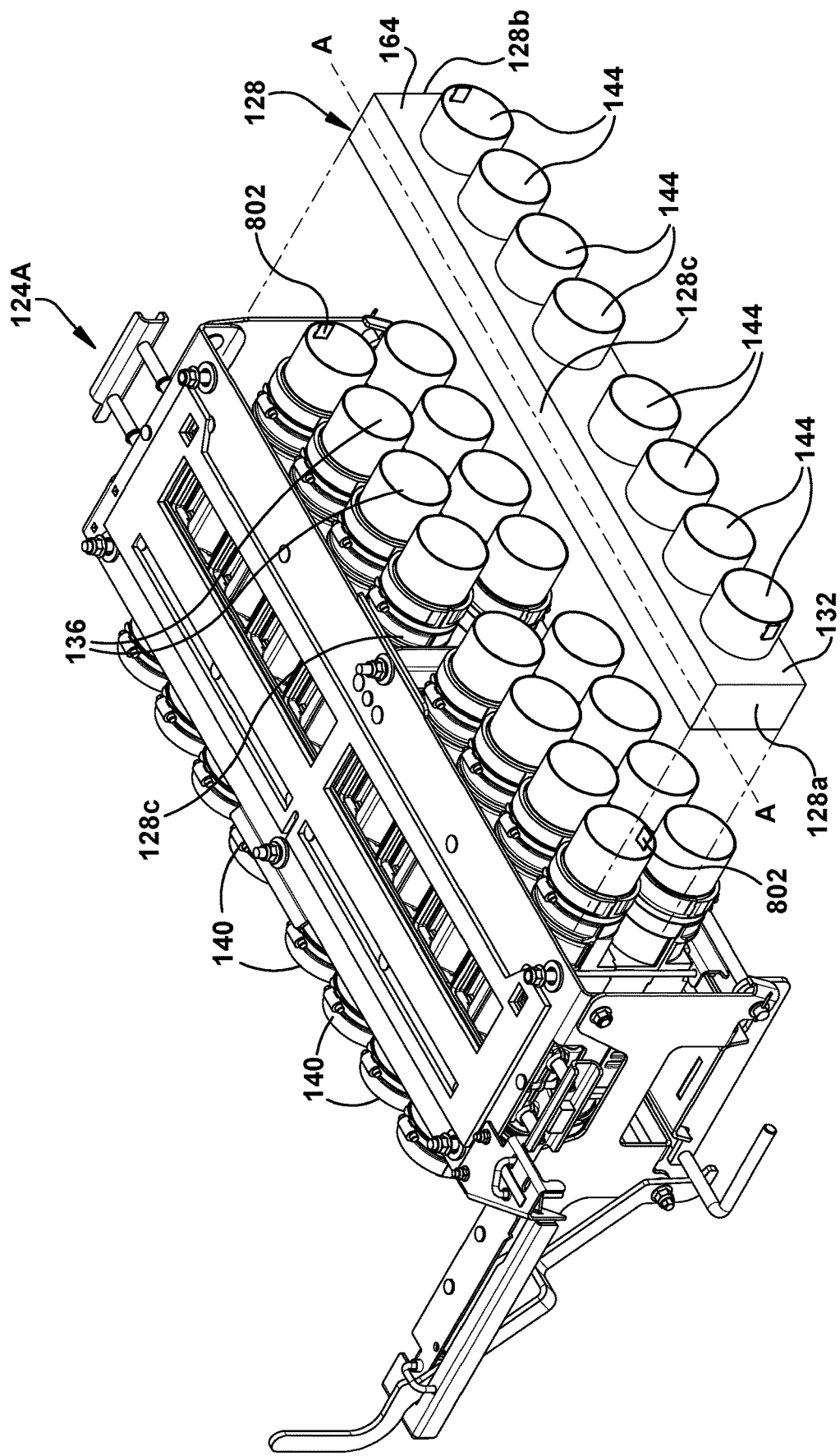
FIG. 5A is a perspective view of a component diagram illustrating another implementation of one or more portions of one or more systems described herein.

With reference to FIGS. 5A and 5B, the first distribution manifold 124A may include a body portion 132 through Which all rows of passages extend from respective inlets 136 to corresponding outlets 140. Adapter couplings, otherwise referred to as tube support projections, may be provided at the various inlets 136 and outlets 140 of the body portion 132 for attaching respective pneumatic hoses, which, in part, establish the various rows of primaries 110. In one example where a distribution manifold may have more than two rows of inlets 144 and outlets 148, the restrictor assembly 128 may be coupled to the lower and middle rows of inlets 136 of the body portion 132 (not shown). With reference to FIGS. 5A and 5B, the restrictor assembly 128 may include a single row of inlets 144 and a single row of outlets 148 or two rows of outlets 148 arranged in register with the first and second rows of inlets 136 of the body portion 132 of the first distribution manifold 124A. The restrictor assembly 128 can be secured to the body portion 132 with one or more fasteners. As shown in FIG. 5A, the restrictor assembly 128 may be secured directly, to the body portion 132, with no additional flow-guiding structures or elements (e.g., hoses, pipes, or separate manifolds) therebetween. In some implementations, hoses, pipes or other manifolds may be utilized to operably connect the restrictor assembly 128 to the body portion 132. However, in other implementations, the flow of one set of primaries 110 may be split into separate sets of primaries at a location spaced upstream of the first distribution manifold 124A, by the restrictor assembly 128 or another similar air flow distribution structure.

Turning to FIGS. 6A-11C, 13 and 14, the restrictor assembly 128 may further comprise a restrictor component 600. The restrictor component 600 may have a body 602. The restrictor component 600 may be configured to selectably move to restrict air flow through the restrictor assembly 128, 228, or a portion thereof, upon identification of a turning event. The restriction of air flow proximate the first end 128a, 228a may be different than the restriction of air flow proximate the second end 128b, 228b. In another implementation, the restriction of air flow proximate the first end 128a, 228a may be less than the air flow proximate the second end 128b, 228b. When air flow is restricted proximate the first end 128a, 228a, air velocity and air volume decrease. As such, the air velocity and air volume increase (commensurate with the decrease at the first end 128a, 228a) as air flow is less restricted proximate the second end 128b, 228b.

The first end 128a, 228a of the restrictor assembly 128, 228 and the second end 128b, 228b of the restrictor assembly 128, 228 are not restricted to the left side and right side of the restrictor assembly 128, 228. Rather, the first end 128a, 228a of the restrictor assembly 128, 228 is associated with an inner or inside curve, and the second end 128b, 228b of the restrictor assembly 128, 228 is associated with an outer or outside curve depending upon the nature of the turning event. During the turning event, a turn forms a curve. The curve has an inner curve and an outer curve. When the turning event is a left turn, the first end 128a, 228a of the restrictor assembly 128, 228 is proximate the inner curve (left side) and the second end 128b, 228b of the restrictor assembly 128, 228 is proximate the outer curve (right side). When the turning event is a right turn, the first end 128a, 228a of the restrictor assembly 128, 228 becomes proximate the inner curve (right side), and the second end 128*b*, 228*b* of restrictor assembly 128, 228 is proximate the outer curve (left side).

It is also contemplated to be within the scope of the disclosure that other components of the seed cart 100 or the seeding tool 109 may be chosen for a frame of reference for defining positions proximate the inner curve and the outer curve of the turning event. In one implementation, the turning event may be triggered by the seed cart 100 (e.g., a front or a rear axle of the seed cart 100) entering a left or right turn. In another implementation, the turning event may be triggered by a downstream event, such as, for example, the seeding tool 109 (e.g., support wheels or one or more ranks of ground engaging tools) entering a left or right turn. Other triggering events may include without limitation, a path planning algorithm by knowing the yaw rate, or the turning of the tractor through receiving a signal from a global positioning system.

Turning to FIGS. 6A, 6B, 13, and 14, one implementation of the restrictor component 600 is illustrated. The restrictor component 600 may be a control vane 172 disposed in the passageway of the restrictor assembly 128, 228. The vane 172 may be disposed between each of one the inlets 144 and a respective outlet 148 of the restrictor assembly 128, 228 to restrict air flow between the inlet 144 and the outlet 148. Each vane 172 may be selectably and variably movable about an axis, e.g., a substantially vertical axis, to control air flow distribution across the restrictor assembly 128, 228. The vanes 172 may be molded plastic or another suitable material. In one implementation each of the vanes 172 may independently movable for example, by one motor or actuator per vane. In another implementation, the vanes 172 can be controlled by receiving control signals from the seed cart 100, wheels 108, global positioning system, or other component of the system. The vanes 172 for all or a portion of the restrictor assembly 128, 228 may be movable together as a unit about a common vertical vane axis. In one implementation, the vane axis may be defined by one or more control rods 176 that may be fixedly secured to the vanes 172 to act as a drive shaft so that rotation of the control rod 176 may drive rotation of the vanes 172. In another implementation, the control rods 176 may be fixedly secured to the vanes 172 to act as a drive shaft so that rotation of the control rod 176 may drive rotation of all or a portion of the coupled control vanes 172 synchronously across the row, but with different vane positions in order of the shift in air distribution from the first side 128*a* of the restrictor assembly 128 to the second side 128*b* of the restrictor assembly 128 during a turning event. For example, the control rod 176 may have a non-circular cross-sectional shape (e.g., square), and each of the control vanes 172 can have a corresponding aperture 180 of any chosen cross-sectional shape to receive the control rod 176. The shape may be circular or noncircular. The control rod 176 may be coupled to a mechanical, electrical, or electro-mechanical linkage, including without limitation, an actuator, electric motor, hydraulic motor, pneumatic motor, etc., in order to move each of the vanes 172.

Each vane 172 may have a flat paddle shape. In another implementation, each vane 172 may comprise stiffening ribs at the location of attachment to the control rod 176. Ends may have a curved edge such as an edge defining a semi-circular profile. The curved edge, which is the free distal end of the vane 172, can be oriented to face in the downstream direction toward the respective distribution manifold inlet 136. Any vane profile and free distal end that is capable of restricting air flow to vary the air flow profile may take any geometry chosen with sound engineering judgment.

Figure 7:
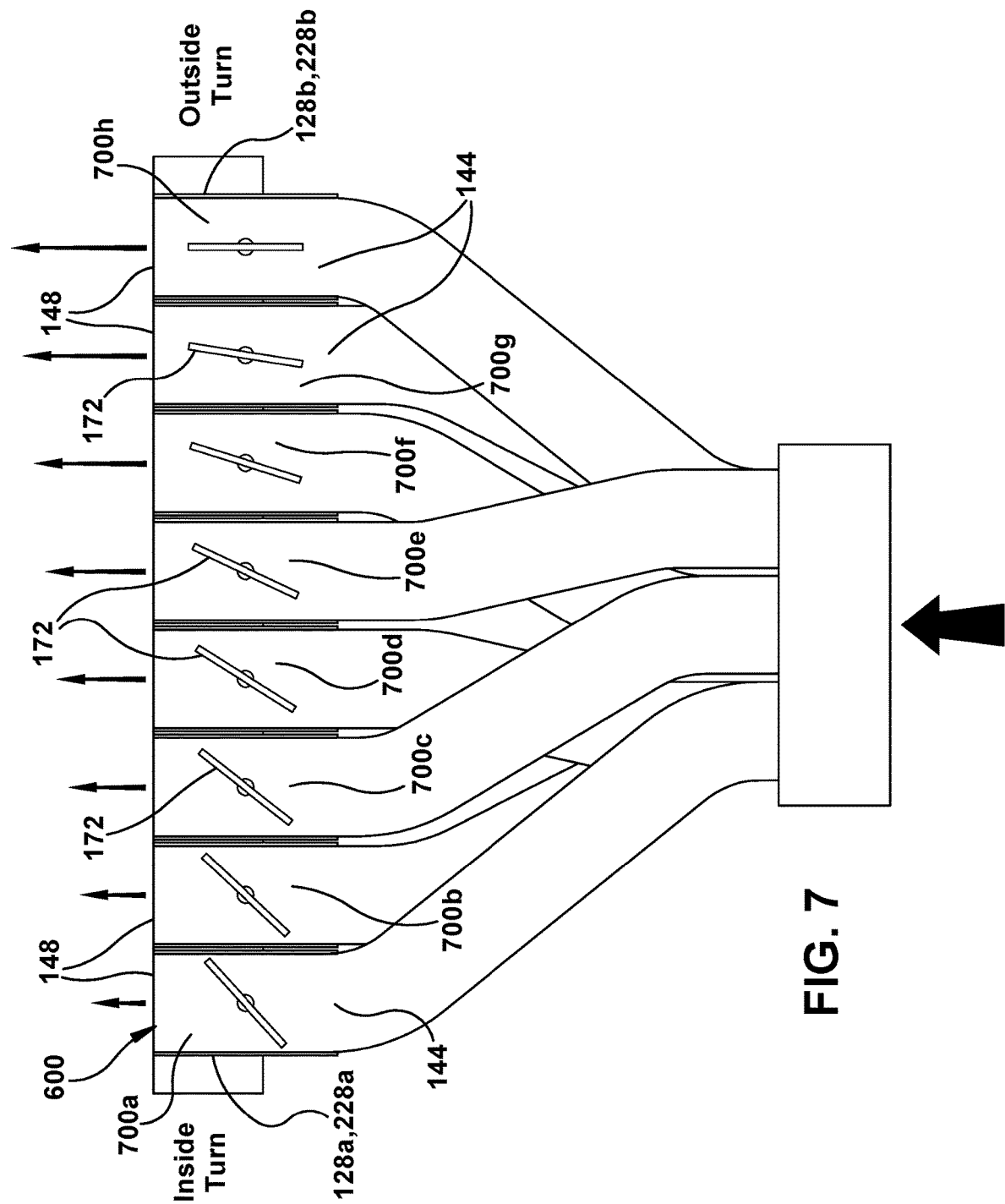
FIG. 7 is a component diagram illustrating another implementation of one or more portions of one or more systems described herein.

Turning to FIG. 7, one implementation of the vanes 172 being the restrictor component 600 is illustrated during a left turn turning event. The arrows are examples of air flow streams received from the fan 120 and going through the restrictor assembly 128, 228. The air flow enters each of the passageways through the inlets 144 and is then restricted as the air flow exits each of the outlets 148 to pass into the set of primary tubes 110 and to the first distribution manifold 124A. A passageway 700*a* most proximate to the first end 128*a*, 228*a* of the restrictor assembly 128, 228 proximate the inside curve may have a vane 172 disposed therein to increase the air flow towards the second end 128*b*, 228*b* of restrictor assembly 128, 228 proximate the outside curve, e.g., the vane is positioned substantially perpendicular to a right cross-section of the passageway. In this implementation, the vane 172 may be positioned such that it contacts or nearly contacts a wall of the restrictor assembly passageway 700*a* to provide the most restricted airflow. An adjacent passageway 700*b*, also proximate to the first end 128*a*, 228*a*, and thus, the inside curve, may have a vane 172 positioned turned toward the outside curve. The vane 172 in passageway 700*b* may be in a less restrictive air flow position than the vane 172 disposed in passageway 700*a*; hence given the same inlet pressure, the air flow exiting the outlet 148 of passageway 700*b* may be greater than the air flow exiting the outlet 148 of passageway 700*a*. During a left turn turning event, the vanes 172 continue to be in a continued less restrictive position towards the second end 128*b*, 228*b* of the restrictor assembly 128, 228 proximate the outside curve. Passageway 700*h* may have a vane 172 disposed therein that is in the least restrictive position, e.g., substantially parallel with the air flow (or walls of the passageway). Passageway 700*g* may have a vane 172 disposed therein that is in a lesser restrictive position than the preceding passageways 700*a*-700*f*, but the vane may be in a more restrictive position than the vane disposed in passageway 700*h*. In one implementation, the center passageways 700*d* and 700*e* may have a constant air flow during a turning event and when there is not a turning event, i.e. there is movement in a substantially straight path. While FIG. 7 illustrates the turning event being a left turn, it is contemplated that when the turning event is a right turn, the vane positions may be reversed. The vanes 172 may be at angles relative to the outlet of the restrictor assembly passageways 700*a*-700*h* depending upon the degree of the turning event. Because the vanes 172 may be movable through infinite positions about the control rod 176, the angle of the proximal end of the vane 172 relative to the outlet 148 or any respective passageway 700*a*-700*h* may be different depending upon the nature of the turning event. For a slight turning event of a just a few degrees left or right, the air restriction proximate the first end 128*a*, 228*a* may be less than if the turning event is much greater, for example, an extended turn with a turning rate of about 2 degrees/sec left or right may cause greater air restriction toward the first end 128*a*, 228*a* of the restrictor assembly 128, 228. The restriction in air flow across the restrictor assembly 128, 228 occurs in real-time in correlation with the radius turn of a particular turning event. For example, when the seed cart 100 turns, the vanes 172 will move in real time to provide the desired air restriction. A smaller or tighter radius will result in greater air restriction on the first end 128*a*, 228*a* of the restrictor assembly 128, 228. If the radius is greater, less air restriction would be desired on the first end 128*a*, 228*a* of the restrictor assembly.

Figure 8:
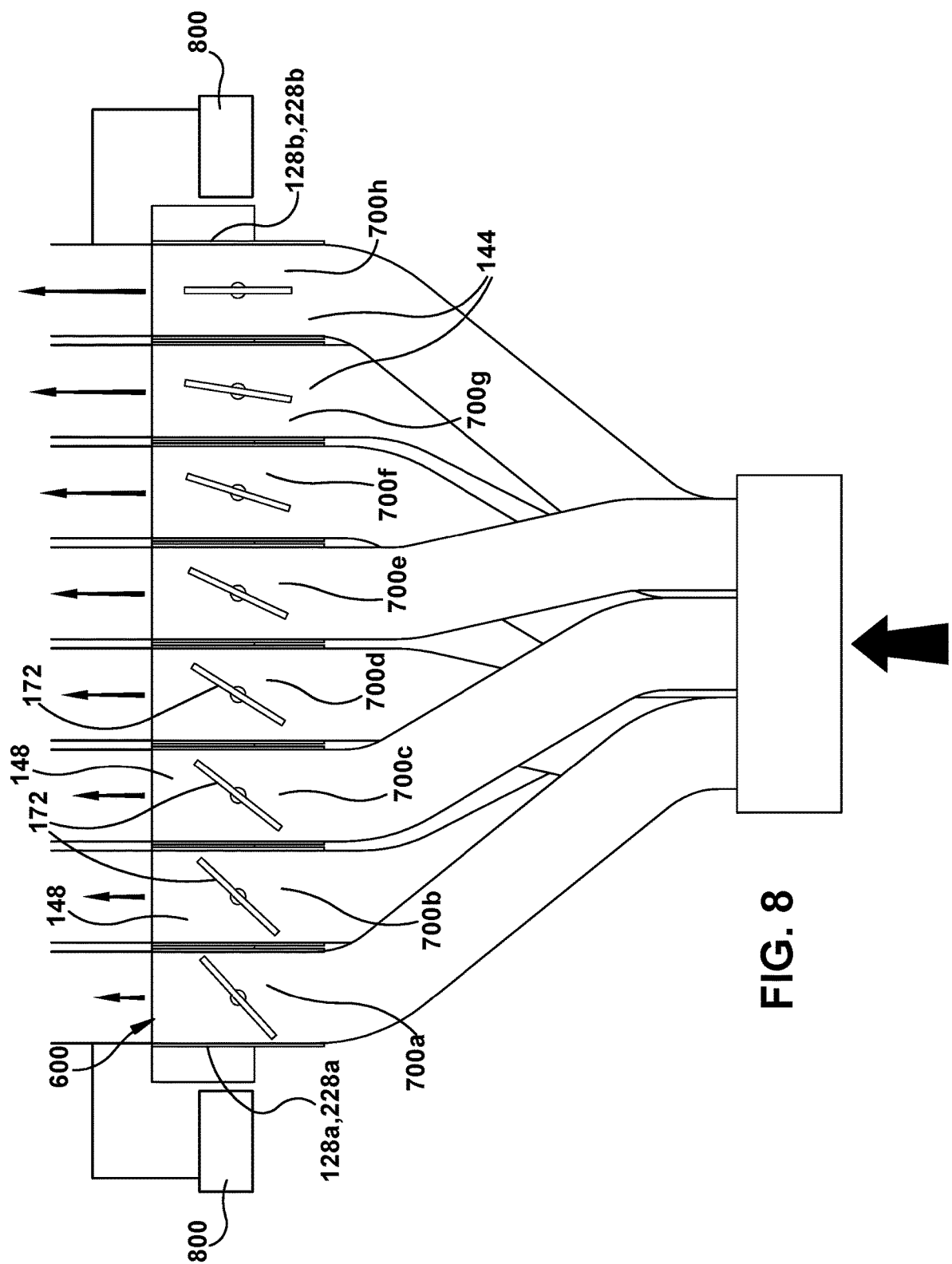
FIG. 8 is a component diagram illustrating another implementation of one or more portions of one or more systems described herein.

Turning to FIG. 8, another implementation is shown where increased airflow is permitted at the second side 128*b*, 228*b*, proximate the outside curve that may have higher back pressure. The vanes 172 being the restrictor component 600 are illustrated. The arrows are examples of air flow streams received from the fan 120 and going through the restrictor assembly 128, 228. The air flow enters each of the passageways through the inlets 144 and is then restricted as the air flow exits each of the outlets 148 to move into and further down the set of primary tubes 110 and into and through the first distribution manifold 124A. The passageway 700*a* most proximate to the first end 128*a*, 228*a* of the restrictor assembly 128, 228 proximate the inside curve may have a vane 172 disposed therein positioned to direct greater air flow toward the second end 128*b*, 228*b* of restrictor assembly 128, 228 proximate the outside curve. In this implementation, the vane 172 may be positioned such that it contacts or nearly contacts a wall of the restrictor assembly passageway to provide the most restricted airflow. In one implementation, air is not completely shut off in any passageway to prevent plugging and clear out the lines. An adjacent passageway 700*b* may have a vane 172 positioned to direct air toward the outside curve. The vane 172 in passageway 700*b* may be in a less restrictive air flow position, e.g., a less occlusive position, than the vane 172 disposed in passageway 700*a*. During a left turn turning event, the vanes 172 continue to be in a continued less restrictive position towards the second end of the restrictor assembly 128, 228 proximate the outside curve. Passageway 700*h* may have a vane 172 disposed therein that is in the least restrictive position being substantially parallel with the air flow. Passageway 700*g* may have a vane 172 disposed therein that is in a lesser restrictive position than the preceding passageways 700*a*-700*f,* but the vane 172 may be in a more restrictive position than the vane 172 disposed in passageway 700*h*. In one implementation, the center passageways 700*d* and 700*e* may have a constant air flow during a turning event and when there is not a turning event, i.e., there is movement in a substantially straight path. While FIG. 8 illustrates the turning event being a left turn, it is contemplated that when the turning event is a right turn, the vane 172 positions may be reversed. When the turning event is a right turn, the vane 172 in passageway 700*b* would be in the most restrictive position and the vane 172 in passageway 700*a* would be in the least restrictive position. The vanes 172 may be at angles relative to the outlet of the restrictor assembly 128, 228 passageways 700*a-h* depending upon the degree of the turning event. Because the vanes 172 may be movable through infinite positions about the control rod 176, the angle of the proximal end (sometimes called the disk, e.g., the disk of a butterfly valve, or a wing) of the vane 172 relative to the outlet 148 or the wall of the passageway 700*a-h* may be different depending upon the nature of the turning event. For a slight turning event of a just a few degrees left and right, the air restriction proximate the first end may be less than if the turning event is much greater, for example, about 45 degrees left or right may cause greater air restriction toward the first end of the restrictor assembly.

With continuing reference to FIG. 8, another implementation is shown. An actuator 800, for example, a pneumatic air cylinder, may be utilized to shift the control rod 176 or throttle linkage of the vanes 172 to direct more air flow to the second end 128*b*, 228*b* of the restrictor assembly 128, 228 with higher product flows, and thus, higher back pressure compared to the first end 128*a*, 228*a* of the restrictor assembly 128, 228, which has lower back pressure. In another implementation, each vane 172 may be moved or rotated using a separate actuator 800. For example, if the restrictor assembly 128 comprises a single row of eight passageways with eight vanes 172 disposed therein, eight actuators 800 may be utilized for each respective vane 172. In another implementation, a portion of vanes 172 be may be controlled by a single actuator 800. For example, a single actuator 800 may control two vanes 172, three vanes 172, or four vanes 172. In an implementation in which a single actuator 800 controls two vanes 172, a restrictor assembly 128 having eight passageways and eight corresponding vanes 172 would have four actuators 800. Any combination of actuators 800 with vanes 172 may be utilized that is chosen with sound engineering judgment in order to adequately direct less air flow to the first side 128*a* of the restrictor assembly 128 and greater air flow to the second side 128*b* of the restrictor assembly 128. In another implementation, the seed cart 100 may have a sensor 802 configured to measure the pressure, e.g., the back pressure, in the set of primary tubes 110. In one implementation, at least two sensors 802 may be disposed at both ends of the first air distribution manifold 124A to detect differential pressure in the primary tubes 110 as shown in FIG. 5A. In another implementation, at least two sensors 802 may be disposed at both 128*a* and 128*b* to detect differential pressure in the primary tubes 110, and may be operably connected, for example, to the restrictor assembly 128, 228.

Upon reaching or exceeding the predetermined differential back pressure threshold, the actuator 800, whether mechanical, electrical, or electromechanical, or hydromechanical, such as the pneumatic air cylinders 800, may shift the vanes 172 to the proper air flow restriction position in each passageway of the restrictor assembly 128 responsive to the predetermined back pressure threshold in order to shift air flow so there is less air flow at the first end 128*a*, 228*a* of the restrictor assembly 128, 228 proximate the inside curve and increased or greater air flow to the second end 128*b*, 228*b* of the restrictor assembly 128, 228 proximate the outside curve. In one implementation, separate actuators 800 may be utilized to selectably move each control vane 172. In another implementation, this may be accomplished by comparing command air flows and adjusting air flow ratiometrically.

Figure 9:
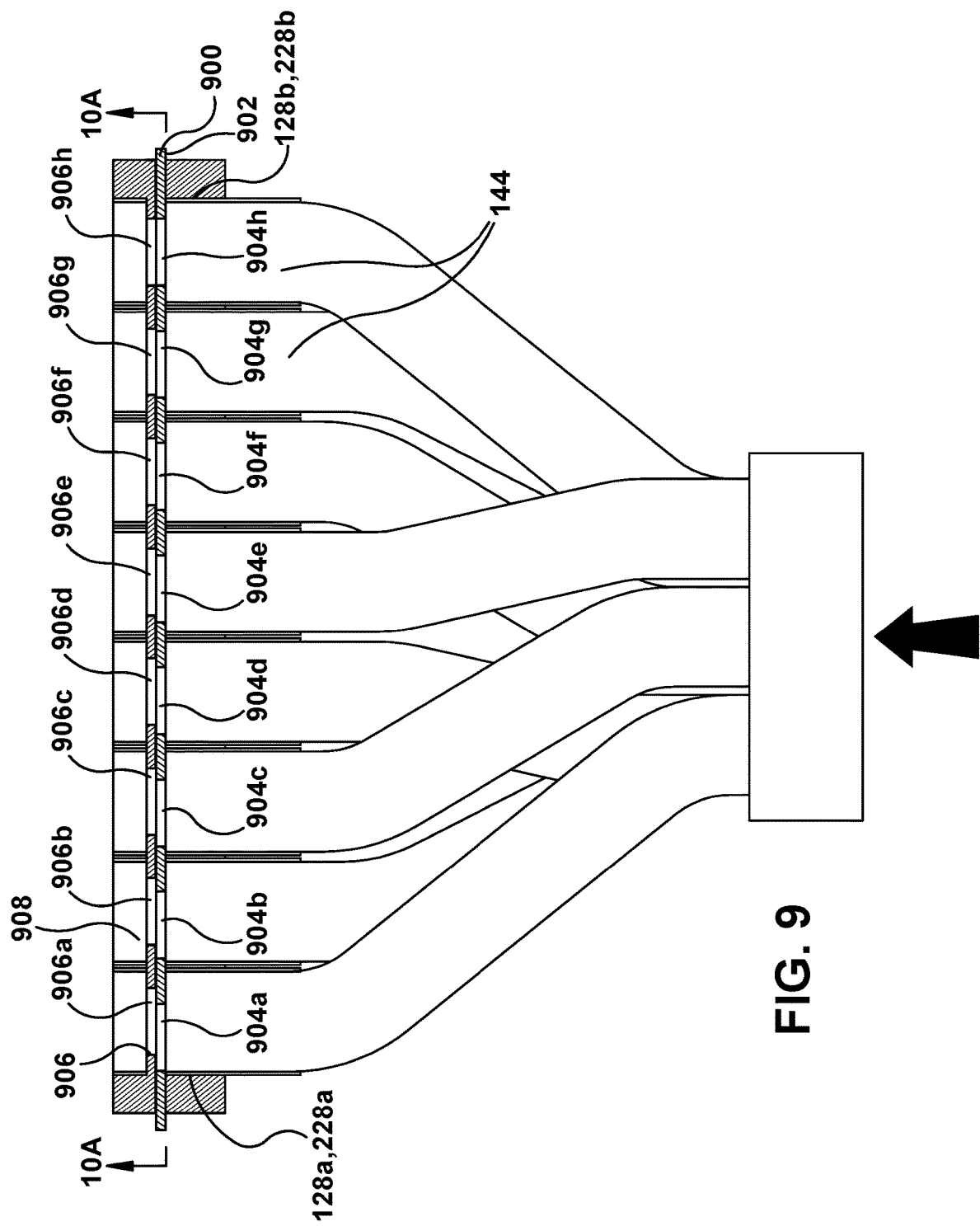
FIG. 9 is a component diagram illustrating another implementation of one or more portions of one or more systems described herein.

FIGS. 9-11C illustrate additional implementations. The restrictor component 600 may take the form of a selectably movable first restrictor plate 900 having a plate body 902. The plate body 902 may having at least one orifice 904 defined therein that may be in fluid communication with each of the outlets of the restrictor assembly 128, 228. In other implementations, a plurality of orifices 904 defined in the plate body 902 may be utilized to stop or reduce the airflow in the primary tubes 110 proximate the first end 128*a*, 228*a* of the restrictor assembly 128, 228 and permit and/or increase the airflow to the primary tubes 110 proximate the second end 128*b*, 228*b* of the restrictor assembly 128, 228. The orifices 904 may be variable. The geometry of the orifices 904 may be any shape chosen with sound engineering judgment, including without limitation, one or more of circular, elliptical, diamond, square, rectangular, triangular, trapezoidal, or polygonal shapes. Varying shapes of the orifices 904 provides for increased variation in airflow for the primary tubes 110 disposed at the second end 128*b*, 228*b* of the restrictor assembly 128, 228. Great variation in air flow may occur with the use of trapezoidal or rectangular geometries than circular or elliptical geometries. The geometry of the orifices 904 may be configured such that the restriction on the center primary tube runs 110 is unchanged but the further to the inside curve of the turn, proximate the first end 128*a*, 228*a* of the restrictor assembly 128, 228, the greater the airflow restriction and the further to the outside curve of the turn, proximate the second end 128*b*, 228*b* of the restrictor assembly 128, 228, the lesser the air flow restriction. In some implementations, the orifices may close with camera-shutter mechanisms to restrict the air flow at the first end 128a, 228a and provide greater air flow at the second end 128b, 228b. In yet another implementation, the restrictor assembly 128, 228 may comprise a second restrictor plate 906. The second restrictor plate 906 may have a plate body 908. The second restrictor plate 906 may have a plurality of orifices 906 defined in the plate body 908, which may be utilized to stop or reduce the airflow in the primary tubes 110 proximate the first end 128a, 228a of the restrictor assembly 128, 228 and permit and/or increase the airflow to the primary tubes 110 proximate the second end 128b, 228b of the restrictor assembly 128, 228. The second restrictor plate 906 may be stationary. The second restrictor plate 906 may be movable in another implementation. The first restrictor plate 902, in another implementation may be stationary and the second restrictor plate 906 may be movable. In a further implementation both the first restrictor plate 900 and the second plate 906 may be movable relative to each other. By way of example, FIG. 9 illustrates a left turn turning event because the alignment of orifices 904a and 906 generates a greater restriction than the orifices of 904h and 906h. In FIGS. 10A-11C, additional implementations are illustrated with horizontal markings illustrate openings defined by alignment of the orifices 904a-904h of the first restrictor plate 900 and the orifices 906a-906h of the second restrictor plate 906. When air flow is restricted proximate the first end 128a, 228a, air velocity and air volume decrease. As such, the air velocity and air volume increase (commensurate with the decrease at the first end 128a, 228a) as air flow is less restricted proximate the second end 128b, 228b.

Figure 10A:
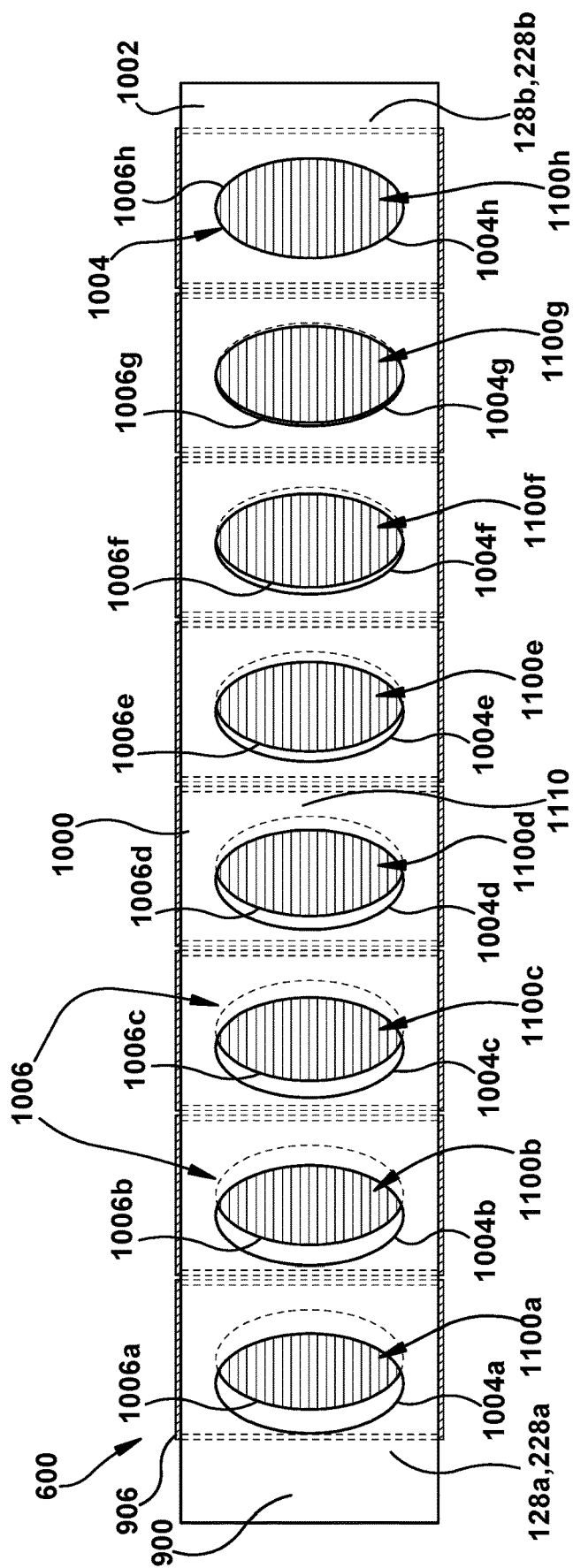
FIG. 10A is a component diagram illustrating an implementation of one or more portions of one or more systems described herein.

FIGS. 10A-10D show an implementation of the variable orifices 1004 being elliptical and circular in shape. With reference to FIG. 10A, the restrictor component 600 may take the form of a selectably movable restrictor plate 1000 having a plate body 1002. The plate body 1002 may having a plurality of orifices 1004 defined therein. Each of the plurality of orifices 1004a, 1004b, 1004c, 1004d, 1004e, 1004f, 1004g, and 1004h may be adjacent to a respective plurality of outlets 1006a, 1006b, 1006c, 1006d, 1006e, 1006f, 1006g, and 1006h of the restrictor assembly 128, 228. For example, orifice 1004a may be adjacent to outlet 1006a, and orifice 1004b may be adjacent to outlet 1006b. FIG. 10A is one non-limiting example of the turning event being a left turn such that plate body 1002 portion adjacent orifice 1004a sufficiently covers outlet 1006a to restrict air flow proximate the first end 128a, 228a of the restrictor assembly 128, 228 and the inside curve of the left turn. As shown in FIG. 10A, the plate 1000 having the plate body 1002 and orifices 1004 defined therein are in fluid communication with each of the outlets 1006 of the restrictor assembly 128, 228. The plate body 1002 proximate to the first end 128a, 228a of the restrictor assembly 128, 228 may be configured to cover at least part of the restrictor assembly outlet 1006a proximate the first end 128a, 228a to decrease air flow through the orifice 1006a and the orifice 1004h may be disposed proximate the second end 128b, 228b and may be substantially aligned with the restrictor assembly outlet 1006h proximate the second end to permit and/or increase air flow through the orifice 1006h proximate the second end 128b, 228b. In another implementation, the restrictor assembly 128, 228 may comprise a center section 1110 disposed between the first end 128a, 228a and the second end 128b, 228b and having restrictor assembly outlets 1006d, 1006e, for example, defined therein. The plate body 1000 may have a center section 1110 with orifices 1004d, 1004e, for example, defined therein. The center section orifices 1004d, 1004e may be configured to align with the center section restrictor assembly outlets 1006d, 1006e for substantially constant air flow and or substantially equivalent air flow during the turning event, and as shown in FIG. 10A, a left turn turning event.

With reference to FIG. 10B, the restrictor component 600 being a restrictor plate 1000 continues to be described. FIG. 10B shows the restrictor plate 1000 having circular orifices 1004 defined therein. The restrictor plate 1000 may be substantially centered due to absence of a turning event. Each of the plurality of orifices 1004a-1004h may be aligned with each of the plurality of restrictor assembly outlets 1006a-10006h. With alignment of the plurality of orifices 1004a-1004h and the plurality of restrictor assembly outlets 1006a-10006h, there is substantially equal or similar air flow restriction at each orifice location.

Turning to FIG. 10C, one non-limiting example of the turning event being a left turn is shown such that plate body 1002 portion adjacent orifice 1004a sufficiently covers outlet 1006a to restrict air flow proximate the first end 128a, 228a of the restrictor assembly 128, 228. As shown in FIG. 10C, the restrictor plate 1000 having the plate body 1002 and orifices 1004 defined therein are in fluid communication with each of the outlets 1006 of the restrictor assembly 128, 228. The plate body 1002 proximate to the first end 128a, 228a of the restrictor assembly 128, 228 may be configured to cover at least part of the restrictor assembly outlet 1006a proximate the first end 128a, 228a, e.g., when in a left turn event, to decrease air flow through that outlet 1006a and the orifice 1004h disposed proximate the second end 128b, 228b may be substantially aligned with the restrictor assembly outlet 1006h proximate the second end 128b, 228b, e.g., when in a left turn event, to permit and/or increase air flow through that outlet 1006h proximate the second end 128b, 228b. The restrictor assembly 128, 228 may comprise a center section 1110 disposed between the first end 128a, 228a and the second end 128, 228b. The plate body 1000 may have the center section 1110 with orifices 1004d, 1004e, for example, defined therein. The center section orifices 1004d, 1004e may be configured to align with the center section restrictor assembly outlets 1006d, 1006e for substantially constant air flow during the turning event, and as shown in FIG. 10C, a left turn turning event.

Figure 10D:
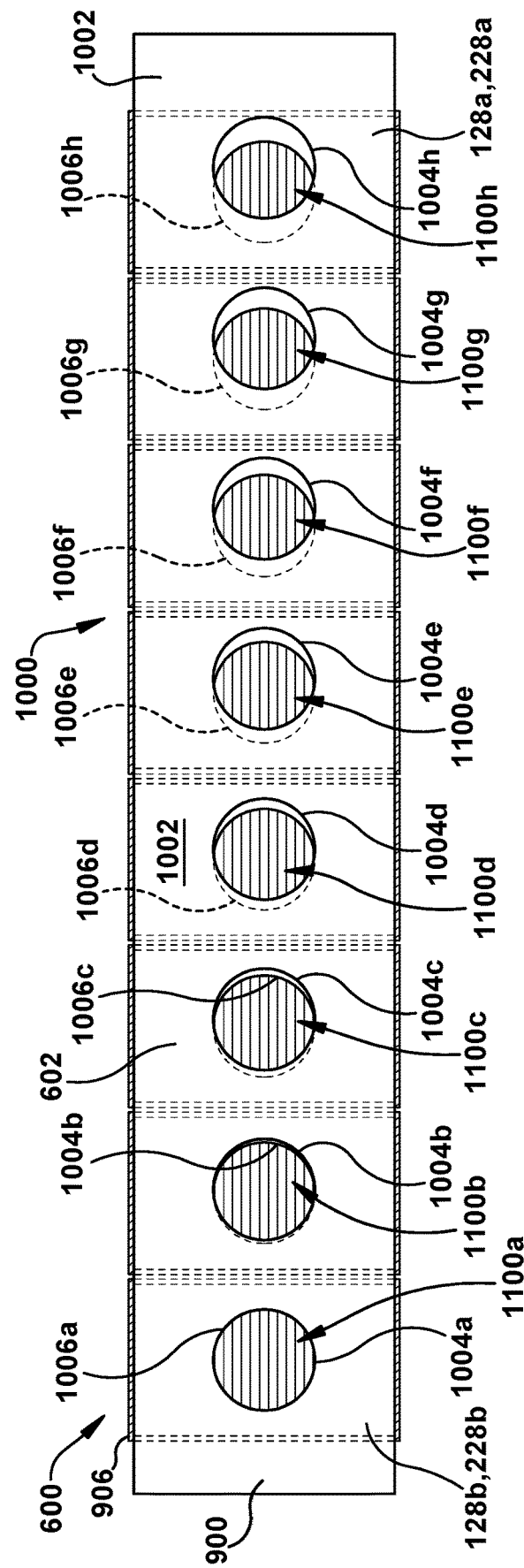
FIG. 10D is a component diagram illustrating another implementation of one or more portions of one or more systems described herein.

With reference to FIG. 10D, a restrictor assembly 128, 228 is shown in another nonlimiting example of a turning event, where the turning event is a right turn. The first restrictor plate 1000 may be shifted to the right to further restrict air flow at the first end 128a, 228a of the restrictor assembly 128, 288. When experiencing a right turn event, the second end 128b, 228b of the restrictor assembly 128, 228 may experience the least amount of restriction and the greatest amount of air flow. With reference to FIG. 10D, the selectably movable first restrictor plate 1000 has the plate body 1002. The plate body 1002 may have the plurality of orifices 1004 defined therein. Each of the plurality of orifices 1004a, 1004b, 1004c, 1004d, 1004e, 1004f, 1004g, and 1004h may be adjacent to each of the plurality of outlets 1006a, 1006b, 1006c, 10046, 1006e, 1006f, 1006g, and 1006h of the restrictor assembly. FIG. 10D is one non-limiting example of the turning event being a right turn such that plate body 1002 portion adjacent orifice 1004h sufficiently covers outlet 1006h to restrict air flow proximate the second end 128b, 228b of the restrictor assembly 128, 228 and the inside curve of the right turn.

Figure 11A:
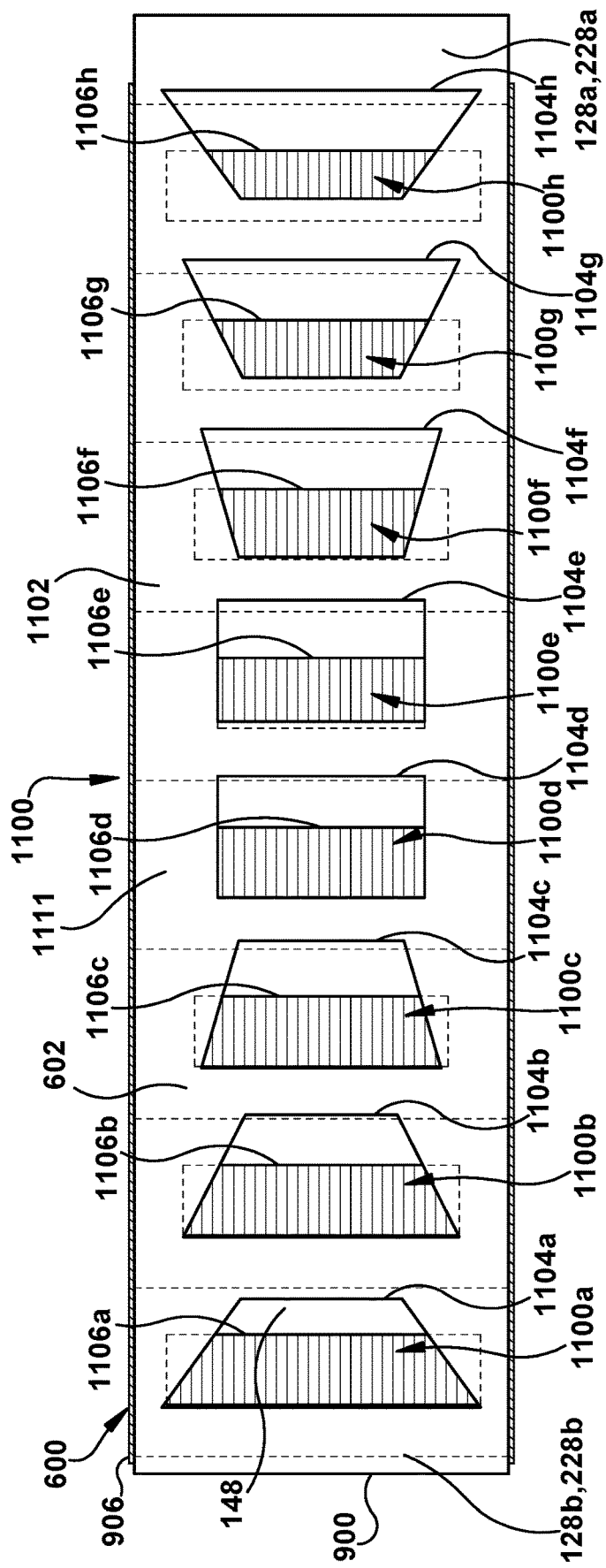
FIG. 11A is a component diagram illustrating another implementation of one or more portions of one or more systems described herein.
Figure 11B:
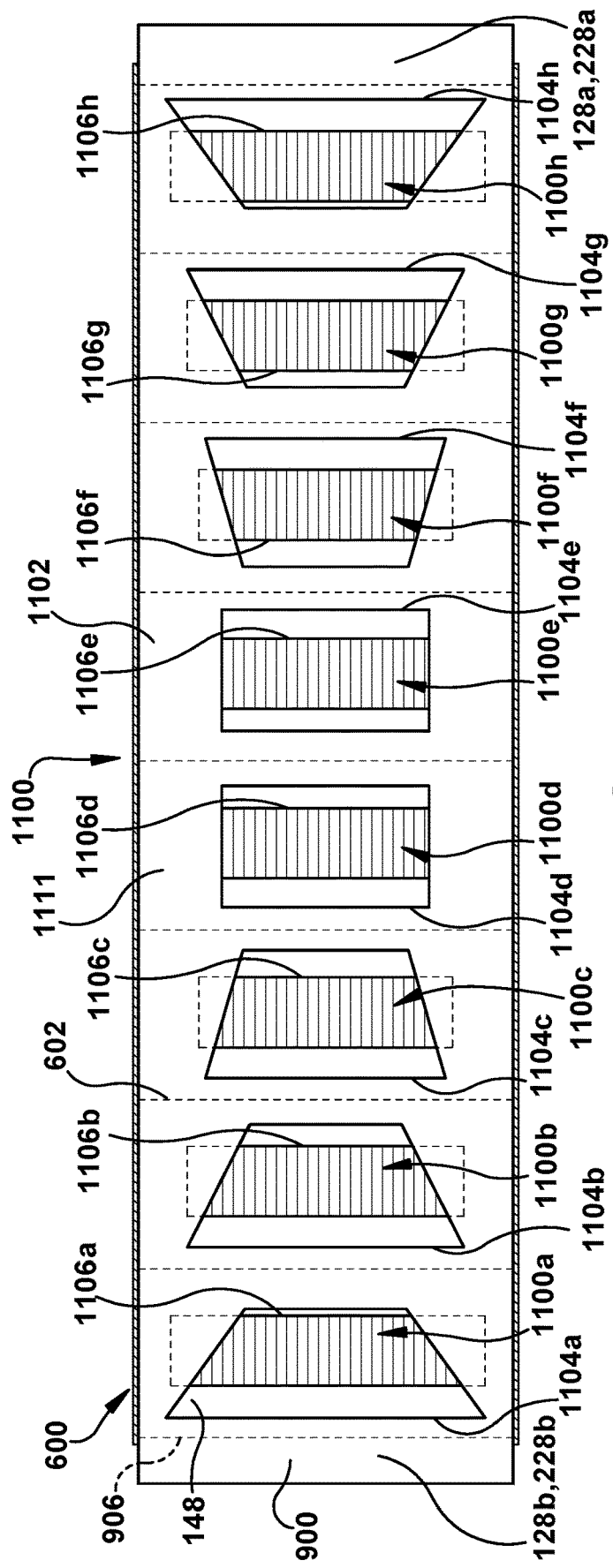
FIG. 11B is a component diagram illustrating another implementation of one or more portions of one or more systems described herein.
Figure 11C:
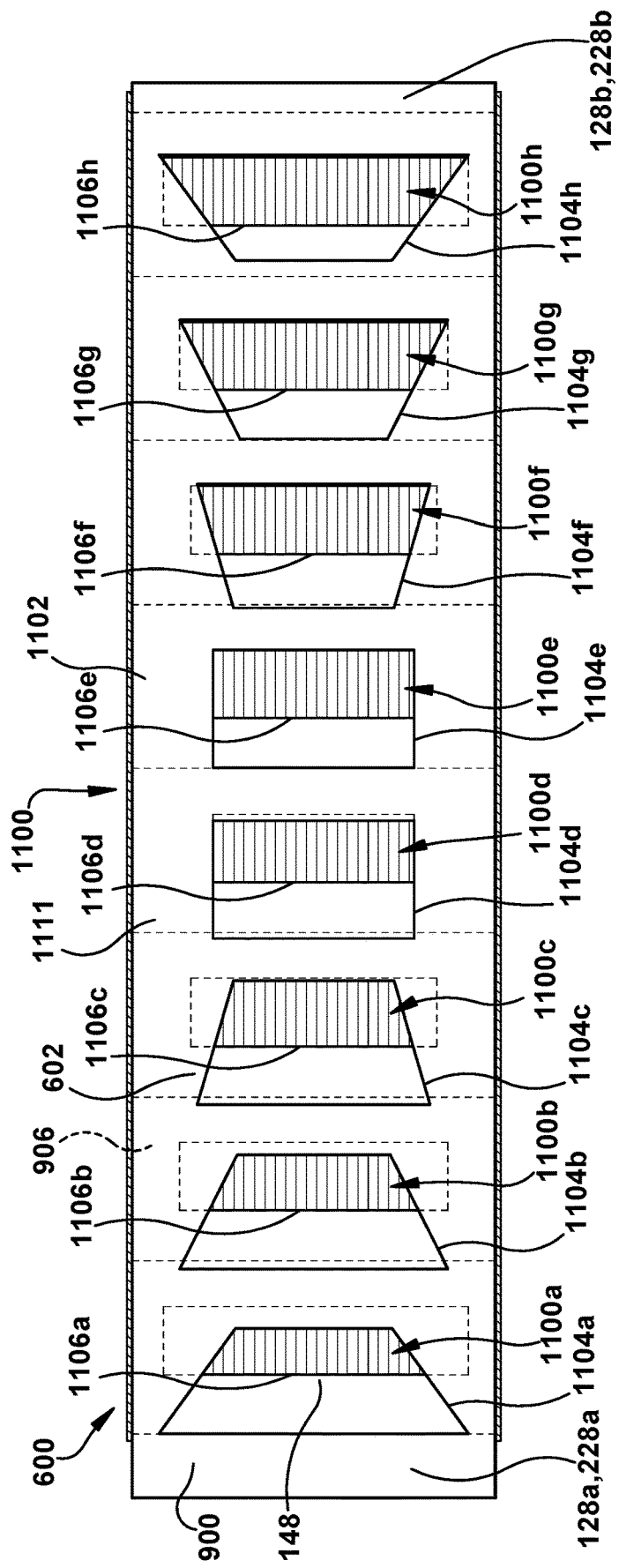
FIG. 11C is a component diagram illustrating another implementation of one or more portions of one or more systems described herein.

FIGS. 11A-11C show an implementation of a restrictor assembly 128, 228 having variable orifices 1104 being trapezoidal shape. The implementation shown in FIGS. 11A-11C is similar to the implementations shown in FIGS. 10A-10D except for the shape of the orifices in the restrictor component 600 and the shape of the outlets in the restrictor assembly 128, 228. With reference to FIG. 11A, the restrictor component 600 may take the form of a selectably movable restrictor plate 1100 having a plate body 1102. The plate body 1102 may have a plurality of orifices 1104 defined therein. Each of the plurality of orifices 1104*a*, 1104*b*, 1104*c*, 1104*d*, 1104*e*, 1104*f*, 1104*g*, and 1104*h* may be adjacent to each of a plurality of outlets 1106*a*, 1106*b*, 1106*c*, 1104*d*, 1106*e*, 1106*f*, 1106*g*, and 1106*h* of the restrictor assembly 128, 228. In this nonlimiting example, the plurality of inlets 1104*a-c* and 1104*f-h* may be trapezoidal. The plurality of inlets 1104*d* and 1104*e* may be trapezoidal or rectangular. The plurality of outlets 1106*a-h* may be rectangular. The restrictor assembly openings 1100*a-h* may be the defined by the overlap of plurality of inlets 1104*a-h* and the plurality of outlets 1106*a-h*.

FIG. 11A shows one non-limiting example of the turning event being a right turn such that plate body 1102 portion adjacent orifice 1104*h* sufficiently covers outlet 1106*h* to restrict air flow proximate the first end 128*a*, 228*a* of the restrictor assembly 128, 228 and the inside curve of the right turn. As shown in FIG. 11A, the plate 1100 having the plate body 1102 and orifices 1104 defined therein are in fluid communication with each of the outlets 1106 of the restrictor assembly 128, 228. The plate body 1102 proximate to the first end 128*a* 228*a* of the restrictor assembly 128, 228 may be configured to cover at least part of the restrictor assembly outlet 1106*h* proximate the first end 128*a*, 228*a* to decrease air flow and the orifice 1104*a* may be disposed proximate the second end 128*b*, 228*b* and may be substantially aligned with the restrictor assembly outlet 1106*a* proximate the second end 128*b*, 228*b* to increase air flow proximate the second end 128*b*, 228*b*. In another implementation, the restrictor assembly 128, 228 may comprise a center section 1111 disposed between the first end 128*a*, 228*a* and the second end 128*b*, 228*b*. The plate body 1100 may have the center section 1111 with orifices 1104*d*, 1104*e* for example defined therein. The center section orifices 1104*d*, 1104*e* may be configured to align with the center section restrictor assembly outlets 1106*d*, 1106*e* for substantially constant air flow during a turning event, including as shown in FIG. 11A, a right turn turning event.

With reference to FIG. 11B, the restrictor component may comprise a restrictor plate 1100 continues to be described. FIG. 11B describes the restrictor plate 1100 having rectangular and trapezoidal orifices defined therein. The restrictor plate 1100 may be substantially centered due to absence of a turning event. Each of the plurality of orifices 1104*a*-1104*h* may be aligned, e.g., maximally aligned, with each of the plurality of restrictor assembly outlets 1106*a*-11006*h*. With alignment of the plurality of orifices 1104*a*-1104*h* and the plurality of restrictor assembly outlets 1106*a*-11006*h*, there is substantially equal air flow restriction at each passageway of the restrictor assembly 128, 228.

Turning to FIG. 11C, one non-limiting example of the turning event being a left turn is shown such that plate body 1102 portion adjacent orifice 1104*a* sufficiently covers outlet 1106*a* to restrict air flow proximate the first end 128*a*, 228*a* of the restrictor assembly 128, 228. As shown in FIG. 11C, the plate 1100 having the plate body 1102 and orifices 1104 defined therein is in fluid communication with each of the outlets 1106 of the restrictor assembly 128, 228. The plate body 1102 proximate to the first end 128*a*, 128*a* of the restrictor assembly 128, 228 may be configured to cover at least part of the restrictor assembly outlet 1106*a* proximate the first end 128*a*, 228*a* to decrease air flow and the orifice 1104*h* may be disposed proximate the second end 128*b*, 228*b* and may be substantially aligned with the restrictor assembly outlet 1106*h* proximate the second end 128*b*, 228*b* to permit and/or increase air flow proximate the second end 128*b*, 228*b*. In another implementation, the restrictor assembly 128, 228 comprises a center section disposed between the first end 128*a*, 228*a* and the second end 128*b*, 228*b*. The plate body 1100 may have the center section 1111 with orifices 1104*d*, 1104*e* for example defined therein. The center section orifices 1104*d*, 1104*e* may be configured to align with the center section restrictor assembly outlets 1106*d*, 1106*e* for substantially constant air flow during the turning event, and as shown in FIG. 11C, a left turn turning event.

In some implementations, the restrictor component 600 may be more than one plate movable over the orifices 904. One separate plate may be positioned to restrict air flow for each orifice, resulting in the use of eight separate plates. One separate plate may be positioned to restrict air flow for two or three orifices. A plate may be positioned to restrict air flow for four orifices, which would require two separate plates. Each separate plate may be independently controlled. In one implementation, if a primary tube is blocked, an independently controlled plate may close that orifice to redirect air flow into the open primary tubes. In some implementations, the plates may move in a direction different than horizontal, such as vertical or at an angle.

With respect to the implementations shown in FIGS. 9-11C, the restriction in air flow across the restrictor assembly 128, 228 occurs in real-time in correlation with the radius turn of a particular turning event. For example, when the seed cart 100 turns, the vanes 172 will move in real time to provide the desired air restriction. A smaller or tighter radius will result in greater air restriction on the first end 128*a*, 228*a* of the restrictor assembly 128, 228. If the radius is greater, less air restriction would be desired on the first end 128*a*, 228*a* of the restrictor assembly.

In yet another implementation, the seed cart may have a fan corresponding with each restrictor assembly passageway, so that each restrictor assembly passageway has variable and independent control over air flow restriction in a manner that has been previously described. It is contemplated that have eight fans with low inertia would enable a quick change of speed to achieve the desired air flow distribution.

In another implementation, when a turning event occurs, only the inside restriction components 600 are activated. By way of nonlimiting example, only the restriction components 600 disposed in passageways 700*a*-700*d* would be activated during a left turn and only the restriction components 600 disposed in passageways 700*e*-700*h* would be activated during a right turn to shift air flow to the second end 128*b*, 228*b* and the first end 128*a*, 228*a* of the restrictor assembly 128, 228, respectively.

Figure 15:
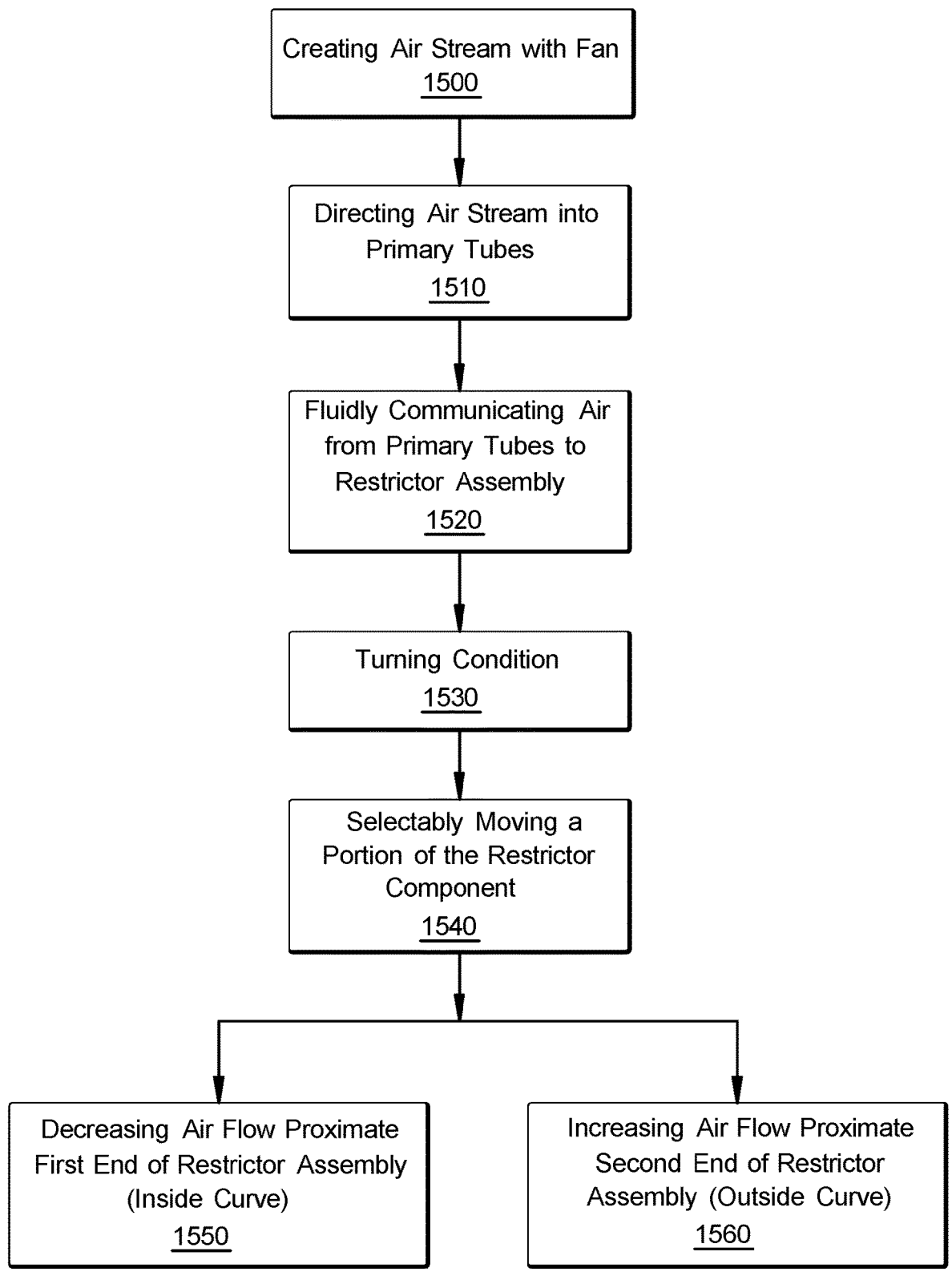
FIG. 15 is a flow chart illustrating use of an implementation of one or more portions of one or more systems described herein.

With reference to FIG. 15, a method for restricting air flow for an air seeder may comprise the steps of creating the air stream with the fan 1500, directing the air stream into the set of primary tubes 1510, and fluidly communicating the air from the primary tubes to a restrictor assembly 1520. Next, a turning condition may be triggered 1530 resulting in selectably moving at least a portion of the restrictor component 1540. Air flow is decreased proximate the first end of the restrictor assembly 1550. Air flow occurs and/or is increased proximate the second end of the restrictor assembly 1560.

When the turning condition is a left turn, the first end of the restrictor assembly may travel along an inside of a curve of the left turn and the second end of the restrictor assembly may travel along an outside curve of the left turn. When the turning condition is a right turn, the first end of the restrictor assembly may travel along an inside of a curve of the right turn and the second end of the restrictor assembly may travel along an outside curve of the right turn. In another implementation, the triggering event may be downstream of the seed cart and occurring with the seeding tool. As such, when the turning condition is a left turn, the first end of the seeding tool may travel along an inside of a curve of the left turn and the second end of the seeding tool may travel along an outside curve of the left turn. When the turning condition is a right turn, the first end of the seeding tool may travel along an inside of a curve of the right turn and the second end of the seeding tool may travel along an outside curve of the right turn.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A seed cart for an air seeder comprising:
   a chassis configured for attachment to an air seeding tool;
   a fan operable to create an air stream;
   a set of primary tubes fluidly coupled to the fan to respectively receive separate portions of the air stream from the fan;
   a distribution manifold having a plurality of air inlets; and
   a restrictor assembly comprising:
      a first end;
      a second end oppositely disposed from the first end;
      a plurality of inlets disposed between the first end and the second end and respectively fluidly coupled with a corresponding primary tube of the set of primary tubes; and
      a plurality of outlets respectively fluidly coupled to each one of the plurality of inlets of the distribution manifold; and,
      a restrictor component having a body and configured to selectably move to restrict air flow upon identification of a turning event, wherein the restriction of air flow proximate the first end is different than the restriction of air flow proximate the second end.

2. The seed cart for an air seeder of claim 1, wherein the turning event is one or more of a seed cart in a turning position and/or the air seeding tool in a turning position.

3. The seed cart for an air seeder of claim 1, wherein the turning event is one or more of a path planning algorithm and/or a signal from a global positioning system.

4. The seed cart for an air seeder of claim 1, wherein the airflow proximate the first end is less than the airflow proximate the second end.

5. The seed cart for an air seeder of claim 1, wherein the restrictor component is a vane, each vane disposed between one of the inlets and a respective outlet of the restrictor assembly to restrict air flow between the inlet and the outlet.

6. The seed cart for an air seeder of claim 5, wherein each vane is variably movable about a substantially vertical axis.

7. The seed cart for an air seeder of claim 1, further comprising an actuator to selectably move the restriction component.

8. The seed cart for an air seeder of claim 1, wherein the restrictor component is a restrictor plate having a plate body and orifices defined therein in fluid communication with each of the outlets of the restrictor assembly, the plate body proximate to the first end configured to cover at least part of the restrictor assembly outlet proximate the first end to decrease air flow and the orifice disposed proximate the second end being substantially aligned with the restrictor assembly outlet proximate the second end to increase air flow proximate the second end.

9. The seed cart for an air seeder of claim 8, wherein the restrictor assembly comprises a center section disposed between the first end and the second end, the plate body having a center section with orifices defined therein, the center section orifices configured to align with the center section restrictor assembly outlets for substantially constant air flow during the turning event.

10. The seed cart for an air seeder of claim 8, wherein the orifices are one or more of circular, elliptical, diamond, square, rectangular, triangular, trapezoidal, or polygonal shapes.

11. The seed cart for an air seeder of claim 1, further comprising:
    a sensor configured to measure back pressures in the set of primary tubes;
    the restrictor component configured to shift air flow proximate the first end to proximate the second end at a predetermined differential in back pressure such that airflow proximate the first end is less than the airflow proximate the second end.

12. An air distribution system for a seed cart, the air distribution system comprising:
    a fan operable to create an air stream;
    a set of primary tubes fluidly coupled to the fan to respectively receive separate portions of the air stream from the fan;
    a distribution manifold having a plurality of passages therethrough;
    a restrictor assembly comprising:
        a first end;
        a second end oppositely disposed from the first end;
        a plurality of inlets disposed between the first end and the second end and respectively fluidly coupled with a corresponding primary tube of the set of primary tubes; and
        a plurality of outlets respectively fluidly coupled to one of the plurality of passages of the distribution manifold;
        an axis extending from the first end to the second end; and,
        a restrictor component having a body and configured to selectably move to restrict air flow along the axis upon identification of a turning event, wherein the air flow proximate the first end is less than the air flow proximate the second end.

13. The air distribution system for a seed cart of claim 12, wherein the first end of the restrictor assembly travels about an inner curve and the second end of the restrictor assembly travels about an outer curve during the turning event.

14. The air distribution system for a seed cart of claim 12, wherein the turning event is a downstream condition of an air seeder tool, the air seeder tool having a first end traveling about an inside curve and a second end traveling about an outside curve.

15. The air seeder for an air distribution system for a seed cart of claim 12, the restrictor component being a vane, each vane disposed between one of the inlets and a respective outlet of the restrictor assembly to restrict air flow between the respective inlet and the outlet, each vane being selectably movable about a parallel axis.

16. A method for redirecting air flow for an air seeder, the method comprising the steps of:
    creating an air stream with a fan;
    directing the air stream into a set of primary tubes;
    fluidly communicating the air from the primary tubes to a restrictor assembly, the restrictor assembly comprising:
        a first end;
        a second end oppositely disposed from the first end;
        a plurality of inlets disposed between the first end and the second end and respectively fluidly coupled with a corresponding primary tube of the set of primary tubes; and
        a plurality of outlets respectively fluidly coupled to one of the plurality of passages of a distribution manifold; and
        a restrictor component having a body;
    triggering a turning condition;
    selectably moving the restrictor component;
    decreasing air flow proximate the first end of the restrictor assembly; and
    increasing air flow proximate the second end of the restrictor assembly.

17. The method of claim 16, triggering the turning condition further comprises:
    turning left, wherein the first end of the restrictor assembly travels along an inside of a curve of the left turn and the second end of the restrictor assembly travels along an outside curve of the left turn.

18. The method of claim 16, triggering the turning condition further comprises:
    turning right, wherein the first end of the restrictor assembly travels along an inside curve of the right turn and the second end of the restrictor assembly travels along an outside curve of the right turn.

19. The method of claim 16, the restrictor component being a vane, each vane disposed between each respective restrictor assembly inlet and restrictor assembly outlet.

20. The method of claim 16, the restrictor component being a selectably movable restrictor plate having a plate body and a plurality of orifices defined in the plate body,
    the step of decreasing air flow proximate the first end of the restrictor assembly further comprising:
        covering a portion of the restrictor assembly inlets proximate the first end with at least a portion of the plate body; and,
    the step of increasing air flow proximate the second end of the restrictor assembly further comprising:
        uncovering at least a portion of the inlets proximate the second end of the restrictor assembly.

* * * * *